(12) United States Patent
Langlitz et al.

(10) Patent No.: US 11,560,017 B2
(45) Date of Patent: Jan. 24, 2023

(54) ADJUSTABLE AXLE ASSEMBLY FOR A VEHICLE

(71) Applicant: AxleTech International IP Holdings, LLC, Troy, MI (US)

(72) Inventors: Amy Danielle Langlitz, Omro, WI (US); Christopher G. Baillie, Lake Orion, MI (US); Jay DeVeny, Birmingham, MI (US); Wallace F. Bisoski, Macomb, MI (US)

(73) Assignee: AxleTech International IP Holdings, LLC, Troy, MI (US)

( * ) Notice: Subject to any disclaimer, the term of this patent is extended or adjusted under 35 U.S.C. 154(b) by 521 days.

(21) Appl. No.: 16/630,162

(22) PCT Filed: Jul. 12, 2018

(86) PCT No.: PCT/US2018/041855
§ 371 (c)(1),
(2) Date: Jan. 10, 2020

(87) PCT Pub. No.: WO2019/014466
PCT Pub. Date: Jan. 17, 2019

(65) Prior Publication Data
US 2020/0231004 A1 Jul. 23, 2020

Related U.S. Application Data

(60) Provisional application No. 62/531,681, filed on Jul. 12, 2017.

(51) Int. Cl.
*B60B 35/10* (2006.01)
*B62D 21/14* (2006.01)
(Continued)

(52) U.S. Cl.
CPC .............. *B60B 35/10* (2013.01); *B62D 21/14* (2013.01); *B60B 35/003* (2013.01); *B60B 35/16* (2013.01); *B60G 2300/40* (2013.01)

(58) Field of Classification Search
None
See application file for complete search history.

(56) References Cited

U.S. PATENT DOCUMENTS

| 2,087,684 A | 7/1937 | Alessi-Grimaldi |
| 2,385,416 A | 9/1945 | Tourneau |
| (Continued) | | |

FOREIGN PATENT DOCUMENTS

| CN | 101857048 B | 11/2011 |
| CN | 102729730 A | 10/2012 |
| (Continued) | | |

OTHER PUBLICATIONS

International Search Report for Application No. PCT/US2018/041855, dated Sep. 19, 2018, 1 page.
(Continued)

*Primary Examiner* — Faye M Fleming
(74) *Attorney, Agent, or Firm* — Brooks Kushman PC

(57) ABSTRACT

An axle assembly for a vehicle. A movable housing is movably positioned within a closed channel defined by a central housing. The movable housing moves the axle assembly between a retracted configuration and an extended configuration. A mounting assembly may be coupled to and spaced from the movable housing and slidably positioned adjacent the central housing. A steering actuator is coupled to a steering arm and the mounting assembly such that the steering actuator moves as a unit. A track assist bracket may be fixedly coupled to the central housing and define a gap sized to slidably receive a mounting plate of the mounting assembly. A bushing may be disposed on each wall of a
(Continued)

telescoping portion of the movable housing. A bellows may be provided to enclose exposed portions of the bushings in the extended configuration. Methods of adjusting the track of the axle assembly are also disclosed.

20 Claims, 14 Drawing Sheets

(51) Int. Cl.
  *B60B 35/00* (2006.01)
  *B60B 35/16* (2006.01)

(56) References Cited

U.S. PATENT DOCUMENTS

| | | | |
|---|---|---|---|
| 2,458,249 A | 1/1949 | Bunting | |
| 2,682,430 A | 6/1954 | Brubaker | |
| 2,693,392 A | 11/1954 | Grosch | |
| 3,348,884 A | 10/1967 | Adams | |
| 3,972,379 A | 8/1976 | Norris | |
| 4,109,747 A | 8/1978 | Hornagold et al. | |
| 4,178,042 A | 12/1979 | Sykes | |
| 4,261,872 A | 4/1981 | Emmons et al. | |
| 4,290,654 A | 9/1981 | Majkrzak et al. | |
| 4,621,872 A | 11/1986 | Yotsumoto et al. | |
| 4,828,071 A | 5/1989 | Gaede | |
| 4,986,386 A | 1/1991 | Iwamoto et al. | |
| 5,005,913 A | 4/1991 | Kittle et al. | |
| 5,282,644 A | 2/1994 | Larson | |
| 5,454,583 A | 10/1995 | Torborg | |
| 5,464,243 A * | 11/1995 | Maiwald | B60B 35/1018 |
| | | | 301/128 |
| 5,489,113 A | 2/1996 | Torborg | |
| 5,489,114 A | 2/1996 | Ward et al. | |
| 6,139,045 A | 10/2000 | Vandenbark et al. | |
| 6,199,769 B1 | 3/2001 | Weddle | |
| 6,206,125 B1 | 3/2001 | Weddle | |
| 6,273,515 B1 | 8/2001 | Taylor | |
| 6,584,390 B2 | 6/2003 | Beck | |
| 6,609,765 B2 | 8/2003 | Radke et al. | |
| 6,715,576 B2 | 4/2004 | Filho | |
| 6,827,176 B2 | 12/2004 | Bean et al. | |
| 6,892,124 B2 | 5/2005 | Humpal et al. | |
| 7,963,361 B2 | 6/2011 | Coers et al. | |
| 8,020,648 B2 * | 9/2011 | Otto | F16F 1/545 |
| | | | 180/6.48 |
| 8,205,892 B2 | 6/2012 | Mackin et al. | |
| 8,205,899 B2 | 6/2012 | Mackin et al. | |
| 8,376,078 B2 | 2/2013 | Hiddema | |
| 8,398,179 B2 | 3/2013 | Mackin et al. | |
| 8,528,923 B2 | 9/2013 | Wakefield et al. | |
| RE45,405 E | 3/2015 | Humpal et al. | |
| 9,132,723 B2 | 9/2015 | Munster et al. | |
| 9,156,312 B1 | 10/2015 | Ruggeri | |
| 9,279,468 B1 | 3/2016 | Philpott | |
| 9,340,084 B2 | 5/2016 | Klinger et al. | |
| 9,346,332 B2 | 5/2016 | Remboski et al. | |
| 9,352,782 B2 | 5/2016 | Tollefsrud et al. | |
| 9,522,707 B2 | 12/2016 | Kern | |
| 9,618,067 B2 | 4/2017 | Philpott | |
| 9,771,970 B1 | 9/2017 | Jong | |
| 10,946,696 B2 * | 3/2021 | Levinson | B60B 35/00 |
| 2004/0129491 A1 | 7/2004 | Bean et al. | |
| 2011/0079977 A1 | 4/2011 | Geiger et al. | |
| 2011/0274378 A1 | 11/2011 | Mackin et al. | |
| 2013/0333959 A1 | 12/2013 | Wagemann et al. | |
| 2014/0292064 A1 | 10/2014 | Hannukalnen et al. | |
| 2015/0290994 A1 | 10/2015 | Dames | |
| 2015/0306910 A1 | 10/2015 | Ruggeri et al. | |
| 2016/0009135 A1 | 1/2016 | Jong | |
| 2016/0096547 A1 | 4/2016 | Dames | |
| 2016/0096550 A1 | 4/2016 | Dames | |
| 2017/0203628 A1 | 7/2017 | Dames et al. | |
| 2017/0247067 A1 | 8/2017 | Gaerke | |
| 2018/0011487 A1 | 1/2018 | Robertson et al. | |
| 2020/0130741 A1 * | 4/2020 | Crowley | B62D 7/06 |

FOREIGN PATENT DOCUMENTS

| | | | | |
|---|---|---|---|---|
| CN | 102765297 B | 6/2014 | | |
| CN | 204322928 U | 5/2015 | | |
| CN | 103158472 B | 5/2016 | | |
| CN | 105583586 A | 5/2016 | | |
| CN | 105584359 A | 5/2016 | | |
| CN | 105587845 A | 5/2016 | | |
| CN | 205239013 U | 5/2016 | | |
| CN | 205244210 U | 5/2016 | | |
| CN | 205255891 U | 5/2016 | | |
| CN | 205255893 U | 5/2016 | | |
| CN | 205255932 U | 5/2016 | | |
| CN | 205256010 U | 5/2016 | | |
| CN | 103459181 B | 6/2016 | | |
| CN | 105656243 A | 6/2016 | | |
| CN | 105668433 A | 6/2016 | | |
| CN | 105673743 A | 6/2016 | | |
| CN | 105673744 A | 6/2016 | | |
| CN | 105697712 A | 6/2016 | | |
| CN | 205270922 U | 6/2016 | | |
| CN | 205271274 U | 6/2016 | | |
| CN | 205271306 U | 6/2016 | | |
| CN | 205278242 U | 6/2016 | | |
| CN | 205331327 U | 6/2016 | | |
| CN | 205350212 U | 6/2016 | | |
| CN | 205350246 U | 6/2016 | | |
| CN | 205350247 U | 6/2016 | | |
| DE | 102007038575 B4 | 5/2016 | | |
| EP | 1502769 A2 | 2/2005 | | |
| EP | 1 685 988 A1 | 8/2006 | | |
| EP | 1485263 B1 | 6/2007 | | |
| EP | 1704078 B1 | 8/2007 | | |
| EP | 1502769 A3 | 3/2008 | | |
| EP | 2988026 A2 | 2/2016 | | |
| EP | 2988026 A3 | 6/2016 | | |
| GB | 767420 A | 2/1957 | | |
| GB | 2128149 B | 7/1986 | | |
| JP | S63195002 A | 8/1988 | | |
| JP | 2001191713 A | 7/2001 | | |
| KR | 100903065 B1 | 6/2009 | | |
| KR | 102130355 B1 * | 7/2020 | | B62D 21/14 |
| WO | 9845154 A1 | 10/1998 | | |
| WO | 03078180 A1 | 9/2003 | | |
| WO | 2005118379 A1 | 12/2005 | | |
| WO | 2008109089 A1 | 9/2008 | | |
| WO | 2015090618 A2 | 6/2015 | | |
| WO | 2015166365 A1 | 11/2015 | | |
| WO | 2016063903 A1 | 4/2016 | | |

OTHER PUBLICATIONS

You Tube, "Video of 2065 Axletech Proving Ground Tractor", https://youtu.be/H76b5Owj9Fk, Aug. 11, 2017, 3 pages.

English language abstract for CN 101857048 B extracted from espacenet.com database on Apr. 2, 2020, 1 page.

English language abstract for CN 102729730 A extracted from espacenet.com database on Apr. 2, 2020, 1 page.

English language abstract for CN 102765297 B extracted from espacenet.com database on Apr. 2, 2020, 1 page.

English language abstract for CN 204322928 U extracted from espacenet.com database on Apr. 2, 2020, 1 page.

English language abstract for CN 105583586 A extracted from espacenet.com database on Apr. 2, 2020, 1 page.

English language abstract for CN 105584359 A extracted from espacenet.com database on Apr. 2, 2020, 2 pages.

English language abstract for CN 105587845 A extracted from espacenet.com database on Apr. 2, 2020, 1 page.

English language abstract for CN 205244210 U extracted from espacenet.com database on Apr. 2, 2020, 1 page.

English language abstract for CN 205239013 U extracted from espacenet.com database on Apr. 2, 2020, 1 page.

(56) References Cited

OTHER PUBLICATIONS

English language abstract for CN 103158472 B extracted from espacenet.com database on Apr. 2, 2020, 1 page.
English language abstract for CN 205255891 U extracted from espacenet.com database on Apr. 2, 2020, 1 page.
English language abstract for CN 205255893 U extracted from espacenet.com database on Apr. 2, 2020, 1 page.
English language abstract for CN 205255932 U extracted from espacenet.com database on Apr. 2, 2020, 1 page.
English language abstract for CN 205256010 U extracted from espacenet.com database on Apr. 2, 2020, 1 page.
English language abstract for CN 205270922 U extracted from espacenet.com database on Apr. 2, 2020, 1 page.
English language abstract for CN 205271274 U extracted from espacenet.com database on Apr. 2, 2020, 1 page.
English language abstract for CN 205271306 U extracted from espacenet.com database on Apr. 2, 2020, 1 page.
English language abstract for CN 205278242 U extracted from espacenet.com database on Apr. 2, 2020, 1 page.
English language abstract for CN 103459181 B extracted from espacenet.com database on Apr. 2, 2020, 1 page.
English language abstract for CN 105656243 A extracted from espacenet.com database on Apr. 2, 2020, 1 page.
English language abstract for CN 105668433 A extracted from espacenet.com database on Apr. 2, 2020, 1 page.
English language abstract for CN 105673743 A extracted from espacenet.com database on Apr. 2, 2020, 2 pages.
English language abstract for CN 105673744 A extracted from espacenet.com database on Apr. 2, 2020, 1 page.
English language abstract for CN 105697712 A extracted from espacenet.com database on Apr. 2, 2020, 1 page.
English language abstract for CN 205331327 U extracted from espacenet.com database on Apr. 2, 2020, 1 page.
English language abstract for CN 205350212 U extracted from espacenet.com database on Apr. 2, 2020, 1 page.
English language abstract for CN 205350246 U extracted from espacenet.com database on Apr. 2, 2020, 1 page.
English language abstract for CN 205350247 U extracted from espacenet.com database on Apr. 2, 2020, 1 page.
English language abstract for DE 102007038575 B3 extracted from espacenet.com database on Apr. 2, 2020, 1 page.
English language abstract for EP 1485263 B1 extracted from espacenet.com database on Apr. 2, 2020, 1 page.
English language abstract for JPS 63195002 A extracted from espacenet.com database on Apr. 2, 2020, 1 page.
English language abstract for JP 2001197713 A extracted from espacenet.com database on Apr. 2, 2020, 1 page.
English language abstract for KR 100903065 B1 extracted from espacenet.com database on Apr. 2, 2020, 1 page.
English language abstract for WO 9845154 A1 extracted from espacenet.com database on Apr. 2, 2020, 1 page.
English language abstract for WO 03078180 A1 extracted from espacenet.com database on Apr. 2, 2020, 1 page.
English language abstract for WO 2016063903 A1 extracted from espacenet.com database on Apr. 2, 2020, 1 page.
Extended European Search Report dated Feb. 25, 2021 for related European Appln. No. 18832683.9; 6 Pages.

* cited by examiner

ADJUSTABLE AXLE ASSEMBLY FOR A VEHICLE

CROSS-REFERENCE TO RELATED APPLICATIONS

This is a national stage entry of International Patent Application No. PCT/US2018/041855, filed on Jul. 12, 2018, which claims the benefit of and priority to U.S. Provisional Patent Application No. 62/531,681, filed on Jul. 12, 2017, each of which is hereby incorporated by reference in its entirety.

TECHNICAL FIELD

The present disclosure is related generally to an axle assembly for a vehicle. More particularly, but not exclusively, the present disclosure is directed to an axle assembly configured to adjust the track of the vehicle between a retracted configuration and an extended configuration.

BACKGROUND

In certain industries it is desirable to utilize a vehicle capable of adjusting its track, or more particularly a distance between opposing wheels. One example includes a lift assembly, such as a boom lift, in which the track may be selectively widened to provide stability when the boom is deployed. Another example of particular interest is agricultural implements for accommodating crops of varying row widths. For example, crops such as corn may be planted in rows spaced by fifteen, twenty, twenty-two, and thirty-inch rows, among others. Other crops, such as soybean and wheat, may be planted at rows spaced by the same or different row widths. The agricultural implement (e.g., planters, sprayers, etc.) traverse the field to perform farm-related tasks, and the wheels of the vehicle are preferably positioned in between the crop rows to minimize impact on the crops themselves.

Known axle assemblies may include an actuator, for example a hydraulic cylinder, for adjusting the track of the vehicle, and another for steering the vehicle. Such an axle assembly may require the steering actuator to extend as the track actuator extends the track of the vehicle. Extension of the steering actuator to compensate for the extension of the track actuator may unnecessarily subject the steering actuator to forces (e.g., impact, vibration, etc.) based on the operational conditions of the vehicle. The need to extend the steering actuator to compensate for the extension of the track actuator may also limit the maximum track to which the axle assembly may be extended. Still further, with the axle assembly at least partially extended, certain components of the axle may be exposed to the external environment. In the context of the agricultural implements previously mentioned, for example, this may include the stalks of the rows of corn that, once of sufficient height, impact the axle and the exposed components. The repeated impact against the components may lead to premature wear and/or suboptimal operation of the axle assembly. Another example includes ingress of particulate from the operating environment that my degrade the movement of movable components of the axle assembly.

Therefore, there is a need in the art for an axle assembly for a vehicle designed to overcome one or more of the aforementioned disadvantages

SUMMARY

An axle assembly for a vehicle is configured to adjust its track and move between a retracted configuration and an extended configuration. The axle assembly includes a central housing comprising at least one sidewall defining a closed channel, and a movable housing movably positioned within the closed channel of the central housing. The movable housing includes an upper wall opposite a lower wall, and opposing lateral walls separating the upper and lower walls. A wheel end assembly coupled is to the movable housing and adapted to be coupled with a wheel rotatable relative to the axle assembly. The wheel end assembly includes a steering arm configured to pivot about a pivot axis. The movable housing moves within the closed channel of the central housing between the retracted configuration in which the wheel end assembly is at a first distance from the central housing, and the extended configuration in which wheel end assembly is at a second distance from the central housing. The second distance is greater than the first distance. A mounting assembly may be fixedly coupled to the movable housing. The mounting assembly includes a mounting plate spaced from one of the opposing lateral walls of the movable housing. The mounting plate is slidably positioned adjacent the sidewall of the central housing as the movable housing moves between the retracted configuration and the extended configuration. A mounting head is fixedly coupled to the mounting plate. The axle assembly further includes a steering actuator comprising opposing ends with a first end coupled to the steering arm and a second end coupled to the mounting head. The first and second ends of the steering actuator move as a unit during the movement of the movable housing between the retracted configuration and the extended configuration.

According to another aspect of the present disclosure, the axle assembly includes a central housing comprising at least one sidewall defining a closed channel. A first movable housing is movably positioned within and at least partially extending from the closed channel of the central housing. A first wheel end assembly is coupled to the first movable housing. The first wheel end is coupled with a first wheel rotatable relative to the axle assembly. A first track actuator coupled to the central housing and the first movable housing. The first track actuator moves the movable housing within the closed channel of the central housing. The axle assembly further includes a second movable housing movably positioned within and at least partially extending from the closed channel of the central housing opposite the first movable housing. A second wheel end assembly is coupled to the second movable housing. The second wheel end assembly is coupled with a second wheel rotatable relative to the axle assembly. A second track actuator is coupled to the central housing and the second movable housing. The second track actuator moves the second movable housing within the closed channel of the central housing. The axle assembly further includes a first set of bushings coupled to the first movable housing and in sliding engagement with a portion of inner sidewalls of the central housing, and a second set of bushings coupled to the second movable housing and in sliding engagement with another portion of inner sidewalls of the central housing.

According to another aspect of the present disclosure, the axle assembly includes a central housing comprising at least one sidewall defining a closed channel. A movable housing is movably positioned within the closed channel of the central housing. A wheel end assembly is coupled to the movable housing. The wheel end assembly is coupled with a wheel rotatable relative to the axle assembly. The movable housing moves within the closed channel relative to the central housing between a retracted configuration in which the wheel end assembly is at a first distance from the central housing, and an extended configuration in which wheel end assembly is at a second distance from the central housing. The second distance is greater than the first distance. The axle assembly includes a track actuator coupled to the central housing and the movable housing. The track actuator configured to move the central housing between the retracted configuration and the extended configuration. The axle assembly further includes a bellows comprising opposing ends and formed from concertinaed sides defining a passageway sized to receive the movable housing. A first end is fixedly coupled to the central housing and a second end is fixedly coupled to one of the movable housing and the wheel end assembly. The second end of the bellows moves as the movable housing moves between the retracted and the extended configurations.

BRIEF DESCRIPTION OF THE DRAWINGS

The disclosure is pointed out with particularity in the claims. The above and further features and benefits of the disclosure are understood by the following Detailed Description taken in conjunction with the accompanying drawings.

DETAILED DESCRIPTION

Figure 1:
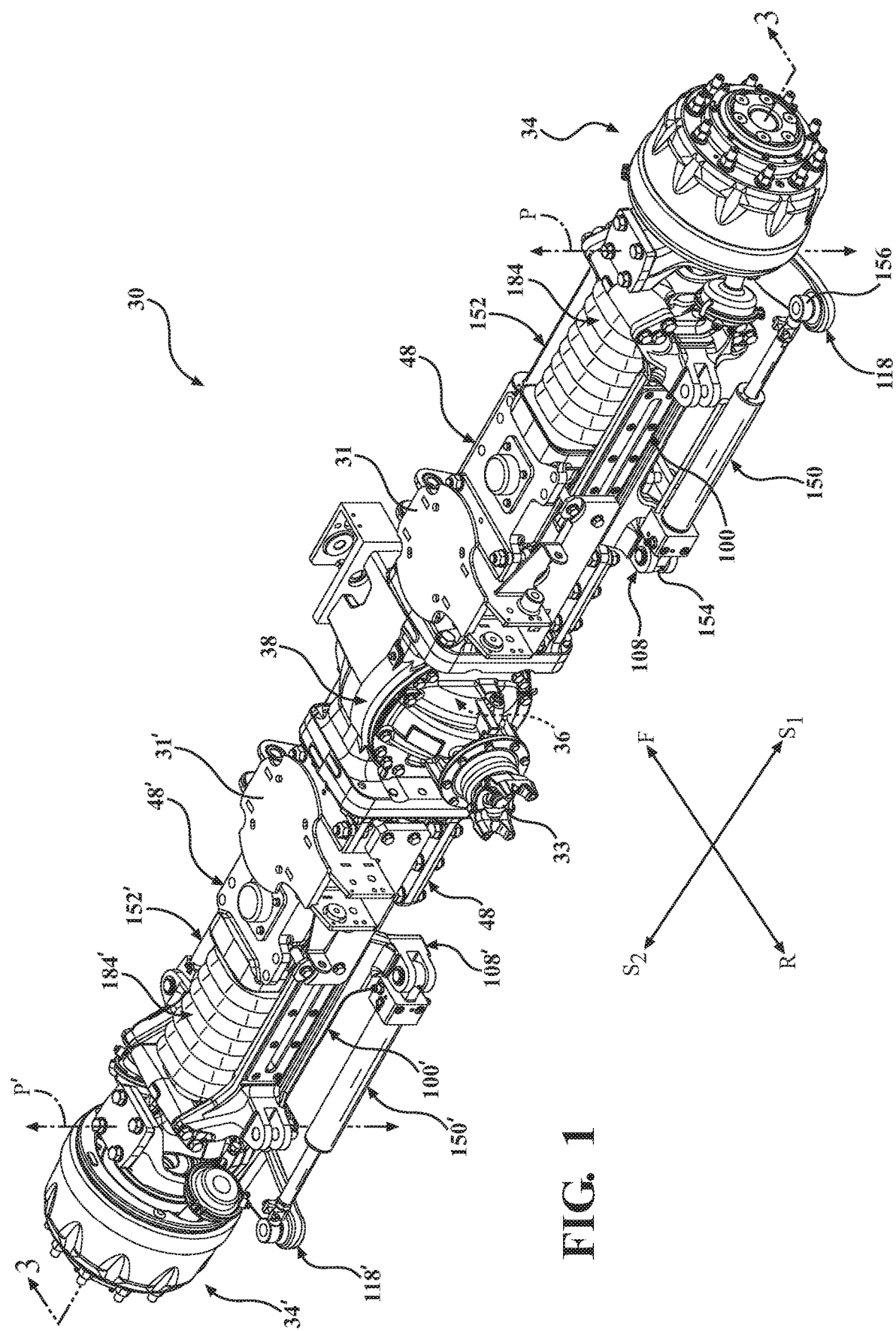
FIG. 1 is a front perspective view of an axle assembly in accordance with an exemplary embodiment of the present disclosure with the axle assembly shown in an extended configuration.
Figure 2:
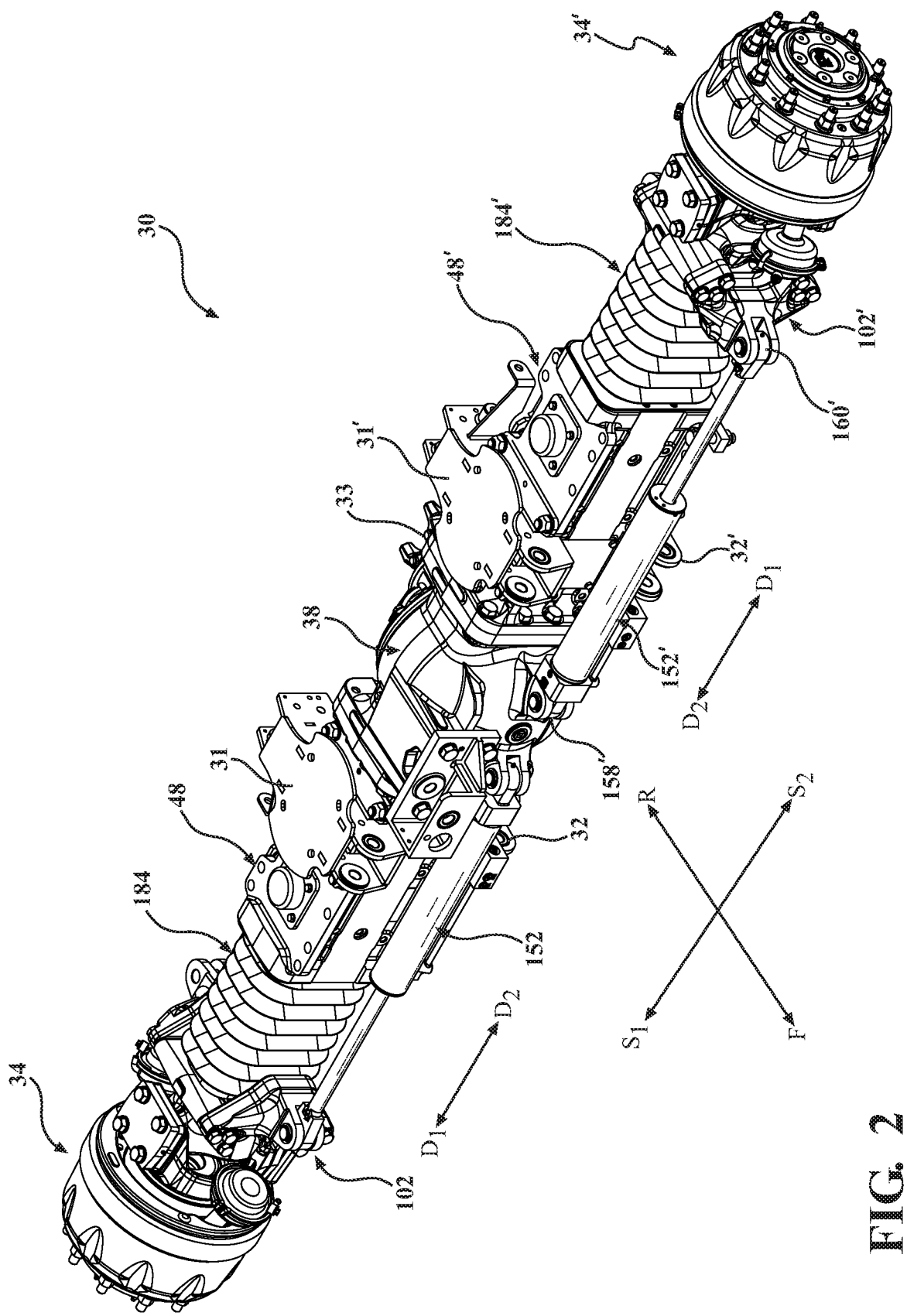
FIG. 2 a rear perspective view of the axle assembly of FIG. 1.

FIGS. 1 and 2 show front and rear perspective views, respectively, of an axle assembly 30 in accordance with an exemplary embodiment of the present disclosure. The axle assembly 30 of FIGS. 1 and 2 is a front axle, but it is to be understood that the advantageous features of the present disclosure to be described may be alternatively applied to a rear axle, or to both the front and rear axles. The axle assembly 30 is adapted to be fixedly installed on a vehicle with wheels coupled thereto such that the axle assembly 30 supports the weight of the vehicle and cargo. For reasons to be described, the axle assembly 30 of the present disclosure may be particularly well suited for agricultural applications (e.g., planters, sprayers, and other farm-related vehicles), but other suitable applications may include commercial truck, construction, defense, forestry, ground support equipment, material handling, mining, refuse, transit, and other specialty vehicles. The axle assembly 30 of the present disclosure may have certain components similar to those the 5000 series family of planetary rigid and steerable axles manufactured by AxleTech International (Troy, Mich.). One or more upper suspension brackets 31, 31' and/or lower suspension brackets 32, 32' may be coupled to the axle assembly 30 in a suitable location to mount the axle assembly 30 to a frame during assembly of a chassis of the vehicle.

The axle assembly 30 includes an input shaft 33 for receiving a rotational input from a transmission of the vehicle. Alternatively, the input shaft 33 may receive the rotational input from a transfer case, for example to synchronize the rotation of the front and rear wheels of the vehicle. In other exemplary embodiments, the axle assembly 30 comprises an electric motor for providing power to wheel ends assemblies 34, 34' of the axle assembly 30. The electric motor may be provided at each of the wheel ends assemblies 34, 34' of the axle assembly 30 as an independent module to provide power to a corresponding one of the wheels of the vehicle. Variations in transferring power from a power source to the wheels are considered within the scope of the present disclosure.

A differential 36 (represented in phantom in FIG. 3) may be disposed within a carrier housing 38 with the input shaft 33 coupled to the differential 36. The differential 36 allows the wheel ends assemblies 34, 34' to rotate at different speeds. This facilitates improved handling of the vehicle, such as when turning the vehicle and/or moving the adjustable axle between a retracted configuration (or first configuration) and an extended configuration (or second configuration) in a manner to be described. In one exemplary embodiment, the differential 36 includes driver-controlled lock (DCDL), air-actuated differential lock, and/or limited slip capacities. The differential 36 and other structures may be disposed within the carrier housing 38 of the axle assembly 30.

For convention throughout the present disclosure, reference made to the compass rose of FIG. 1 showing a front (F) direction (i.e., towards a front of the vehicle including the axle assembly 30), a rear (R) direction opposite the front direction, a first side (S1) direction, and a second side (S2) direction opposite the first side. The structure and function of the axle assembly 30 may be symmetric about a midline separating the first and second sides. In other words, where a structure and/or function of the axle assembly 30 is described in relation to one of the wheel end assemblies 34, 34', it is to be understood a corresponding structure and/or function is associated with the other one of the wheel end assemblies 34, 34' of the axle assembly 30 (denoted by a prime (') symbol) even if not explicitly identified in the interest of brevity. The midline may also be coincident with the input shaft 33.

Figure 3:
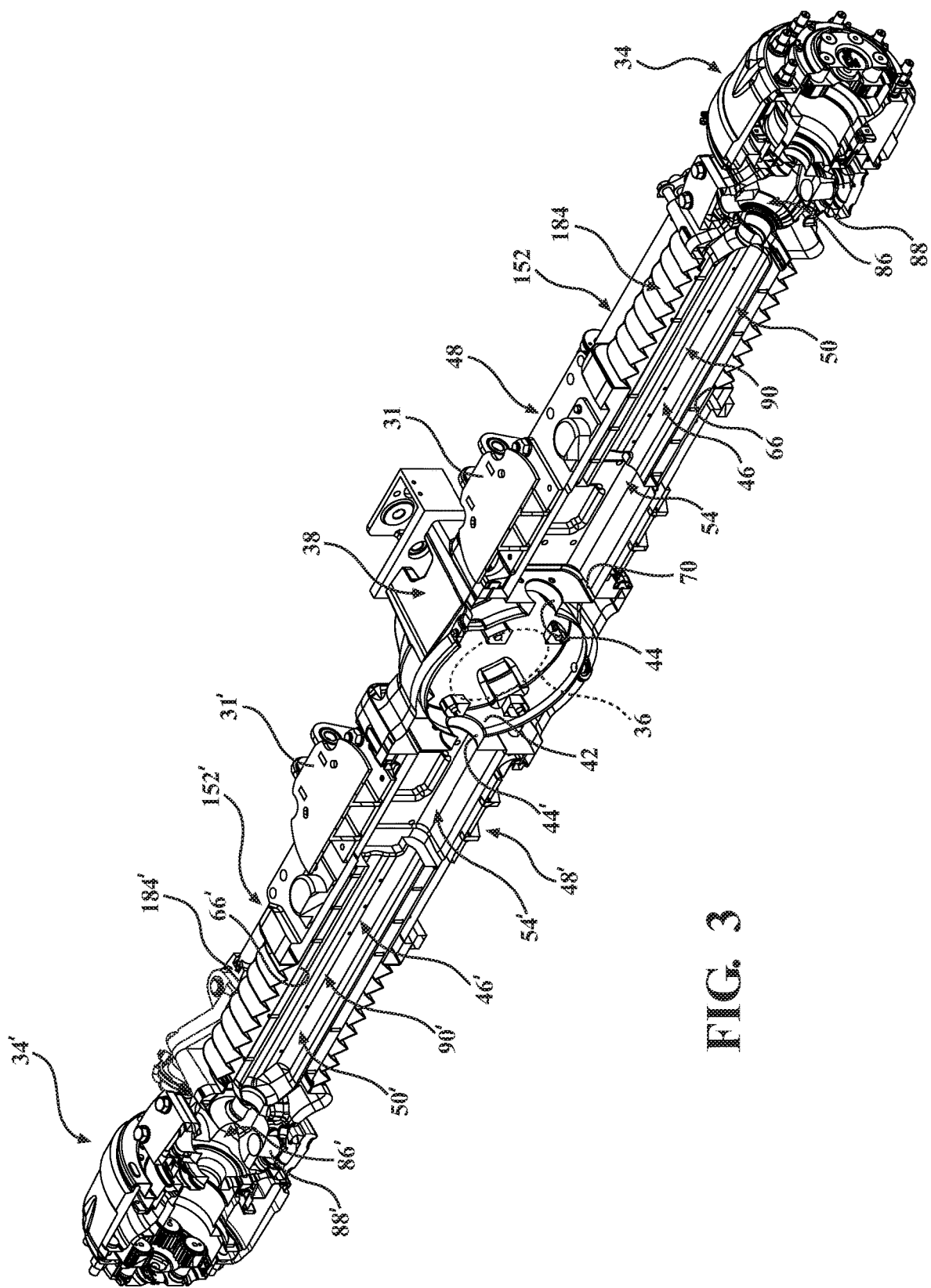
FIG. 3 is a cross sectional view of the axle assembly of FIG. 1 taken along section lines 3-3 with certain internal structures of the axle assembly removed for clarity (e.g., a differential and drive shafts).

The carrier housing 38 is positioned intermediate and substantially in alignment with the wheel ends assemblies 34, 34' such that the axle assembly 30 is generally rectilinear in arrangement. The carrier housing 38 also may be substantially symmetric about the aforementioned midline. The carrier housing 38 is shaped to accommodate the differential 36 receiving the input shaft 33 and providing an output to a drive shaft 40 (see FIG. 11), and in particular a first drive shafts 40 and a second drive shaft 40'. The drive shafts 40, 40' extending from the carrier housing 38 in the first and second side directions (S1, S2). As best shown in FIG. 3, the carrier housing 38 includes at least one sidewall 42 defining opposing apertures 44, 44'. Each of the drive shafts 40, 40' extends through one of the apertures 44, 44'. In other words, the differential 36 disposed within the carrier housing 38 receives the input shaft 33 rotating with a speed and torque from the rear direction (R), and transfers at least a portion of the speed and torque to one or both of the drive shafts 40, 40'. One of the drive shafts 40 extends in the first side direction (S1) towards one of the wheel end assemblies 34, and another one of the drive shafts 40' extends in the second side direction (S2) towards the other one of the wheel end assemblies 34'. In the illustrated embodiment, the drive shafts 40, 40' advantageously extend through interior passageway 46, 46' to be operably coupled to the wheel end assemblies 34, 34'. The drive shafts 40, 40' extending through the interior passageways 46, 46' of the axle assembly 30 provides for, among other advantages, a compact design that limits or prevents exposure of the rotating drive shafts 40, 40' to the demanding environmental conditions of the vehicle on which the axle assembly 30 is installed.

Figure 6:
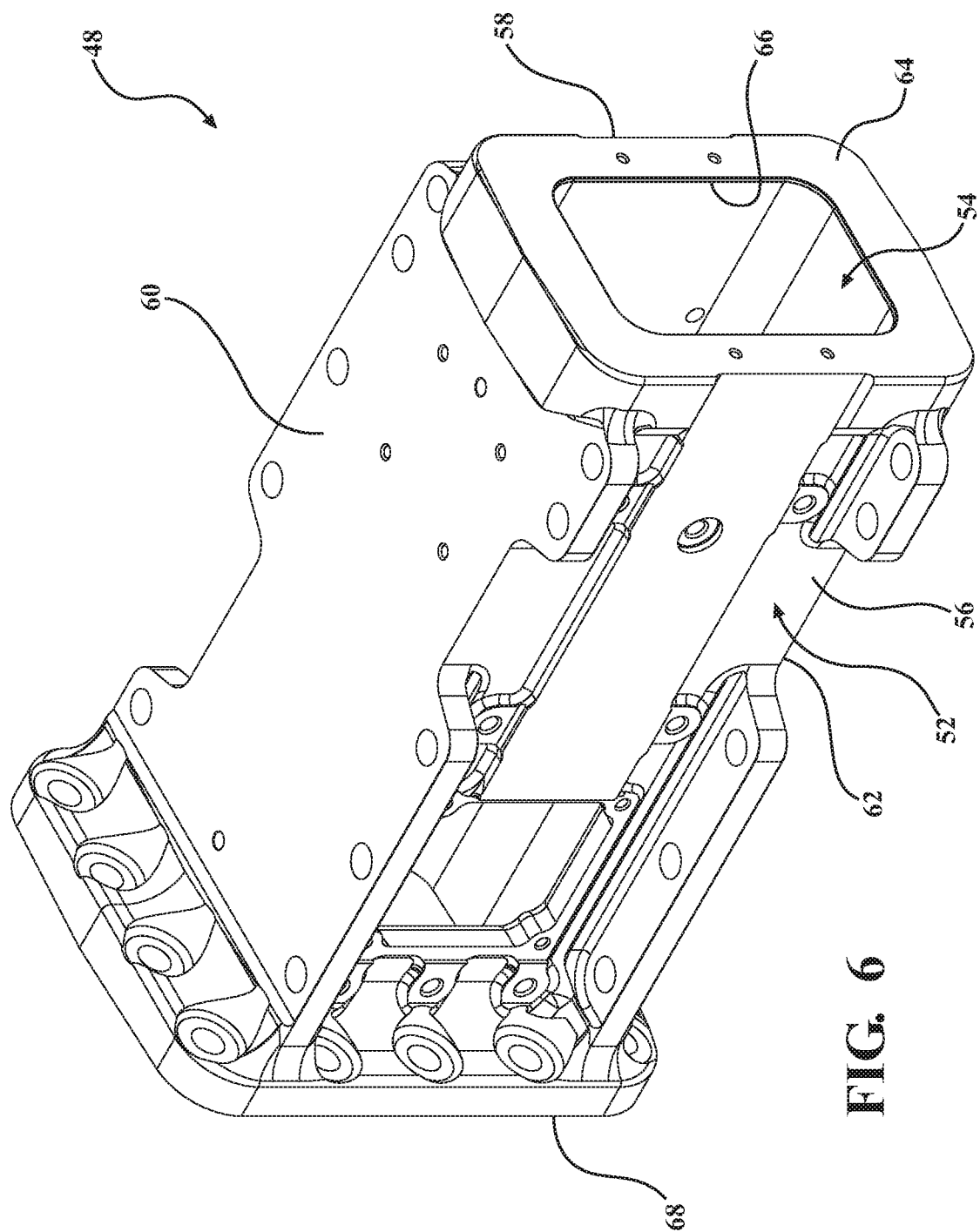
FIG. 6 is a perspective view of the central housing of the axle assembly of FIG. 1.

With continued reference to FIGS. 1-3, the axle assembly 30 includes a first central housing 48 and a second central housing 48'. The central housing 48 is coupled to the carrier housing 38. As used herein, "central" means closer to the midline of the axle assembly 30 relative to a movable housing 50 to be described. By extension, it is considered that the carrier housing 38 is more central (i.e., proximal to the midline) than the central housing 48 with the wheel end assembly 34 being distal to the central housing 48. With concurrent reference to FIG. 6, the central housing 48 includes at least one sidewall 52 defining a closed channel 54. In particular, the illustrated embodiment shows the at least one sidewall 52 including opposing sidewalls 56, 58 separating an upper wall 60 opposite a lower wall 62 to define the closed channel 54 that is square or rectangular in cross section. The central housing 48 includes a first or distal end 64 defining a first or distal aperture 66, and a second or proximal end 68 defining a second or proximal aperture 70 (see FIG. 3). The distal and proximal apertures 66, 70 open into and at least partially define the closed channel 54. As used herein, "closed" means substantially surrounded on all sides but open at the ends, in particular to permit the drive shaft 40 to extend through the closed channel 54 at least partially defining the interior passageway 46.

As mentioned, central housing 48 is coupled to the carrier housing 38. An annular flange sized and shaped to be fixed with the sidewall 52 of the carrier housing 38 may define the proximal end 68 of the central housing 48. With the central housing 48 fixed to the carrier housing 38, the closed channel 54 is in communication with the aperture 44 and an interior of the carrier housing 38 accommodating the differential 36 and other components. The drive shaft 40 extends through the aperture 44 and the closed channel 54.

The upper and lower suspension brackets 31, 32 may be fixed to the central housing 48. FIG. 3 shows the upper suspension bracket 31 fixed to the upper wall 60 of the central housing 48, and FIG. 2 shows the lower suspension bracket 32 extending from the lower wall 62 of the central housing 48. The fixing of the upper and lower suspension brackets 31, 32 to a corresponding structure of the chassis of the vehicle may provide the primary support for the axle assembly 30.

Figure 7:
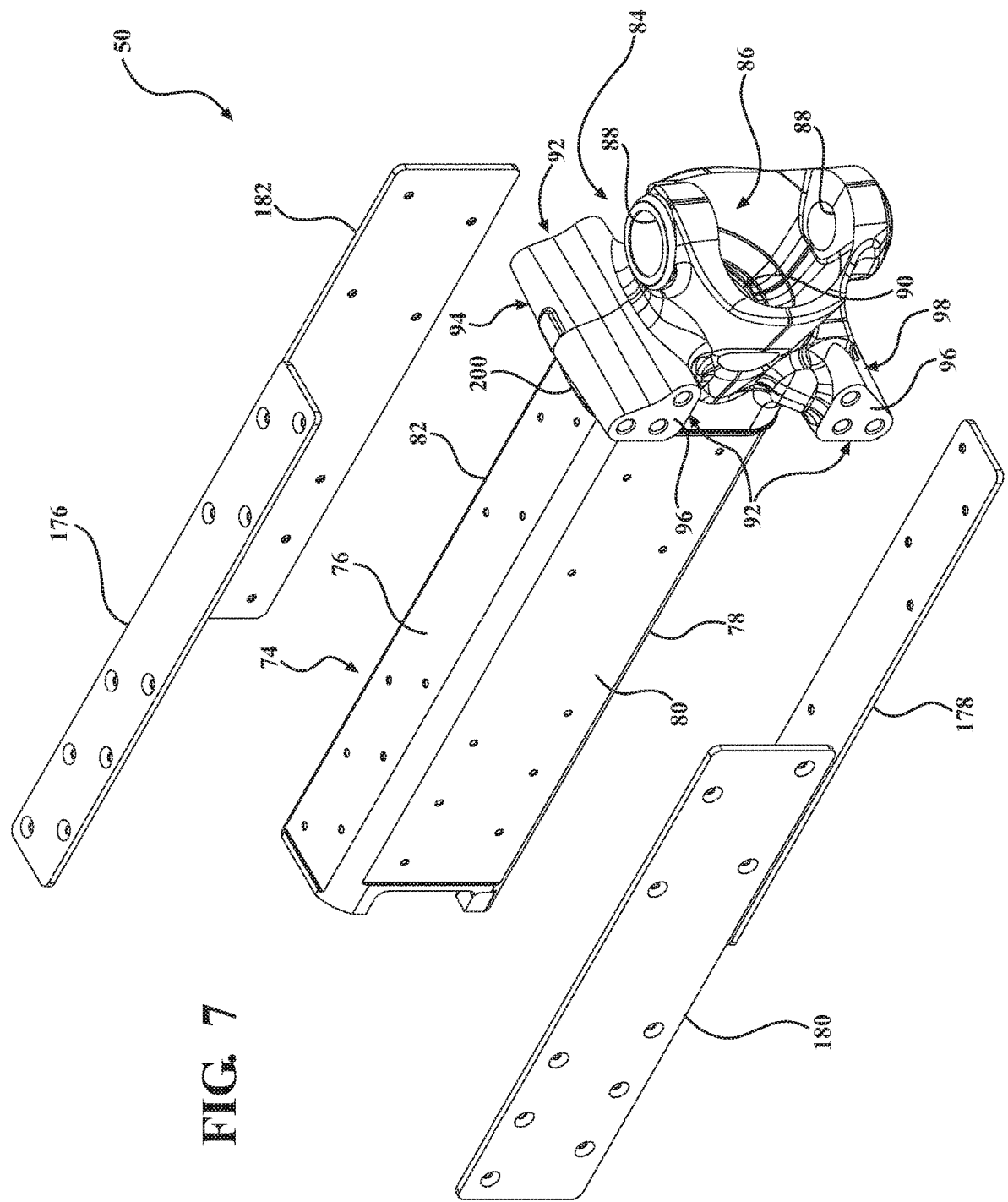
FIG. 7 is an exploded view of the movable housing of the axle assembly of FIG. 1 with bushings configured to be coupled to walls of a telescoping portion of the movable housing.

The axle assembly 30 includes the first movable housing 50 movably coupled with the central housing 48 opposite the carrier housing 38 (and a second movable housing 50' coupled to the second central housing 48'). The movable housing 50 slidably moves relative to the central housing 48 as the axle assembly 30 moves between a retracted configuration (see FIGS. 4B and 5B) and an extended configuration (see FIGS. 1-3, 4A and 5A) to be described in detail. In other words, the movable housing 50 and the central housing 48 may be in a telescoping arrangement. The movable housing 50 includes a telescoping member or portion 74 positioned within the closed channel 54 of the central housing 48. The telescoping portion 74 at least partially extends from the distal aperture 66. As best shown in FIG. 7, the telescoping portion 74 includes an upper wall 76, a lower wall 78 opposite the upper wall 76, and opposing lateral walls 80, 82 separating the upper and lower walls 76, 78. The upper, lower, and lateral walls 76-82 of the telescoping portion 74 of the illustrated embodiment generally define a cross-sectional profile sized to be snugly and slidably received within the closed channel 54 of the central housing 48. In the illustrated example, the cross-sectional profile is substantially square or rectangular sized to be snugly and slidably received within the closed channel 54 having a complementary cross-sectional profile.

The movable housing 50 further includes a coupling portion 84 coupled to integrally formed with the telescoping portion 74. The coupling portion 84 may provide an interface to receive a complementary component of the wheel end assembly 34. With continued reference to FIG. 7, the coupling portion 84 may be generally hemispherical in shape and define a trunnion socket 86. The trunnion socket 86 includes a pair of apertures 88 coaxially aligned and configured to receive a king pin (not shown) of the wheel end assembly 34. The king pin defines a pivot axis (P) to permit the wheel end assembly 34 to pivot about the pivot axis. As generally indicated from FIG. 7, the king pin is to be oriented substantially vertically within the trunnion socket 86 such that the wheel end assembly 34 pivots in the fore and aft directions in response to an output from the steering actuator 150 in a manner to be described.

With concurrent reference to FIG. 3, the movable housing 50 defines a closed channel 90 (also referred to herein as a void space) extending through the movable housing 50. In particular, each of the telescoping portion 74 and the coupling portion 84 define at least a portion of the closed channel 90. FIG. 7 shows at least a portion of the closed channel 90 being square-shaped in cross section and defined by inner surfaces of each of the upper, lower, and lateral walls 76-82 of the telescoping portion 74, and another portion being circular-shaped in closed section and defined by an aperture of the coupling portion 84 in communication with the trunnion socket 86. The closed channel 90 of the movable housing 50 at least partially defines the interior passageway 46 of the axle assembly 30. The closed channel 90 is in communication with the closed channel 54 of the central housing 48, and further in communication with the interior of the carrier housing 38. The drive shaft 40 extends through the closed channel 90 of the movable housing 50 to transfer power from the differential 36 to the wheel end assembly 34.

Certain features of the axle assembly 30 near the wheel end assembly 34 will now be described. An output drive (not shown) coupled to an end 204 of the drive shaft 40 (see FIG.

11) may include a spline 212 configured to be operably coupled with a planetary gearing system (not shown) for reducing the rotational input from the output drive and the drive shaft 40 into a rotational output to the wheel end assembly 34 having the desired speed and torque characteristics. For example, the gear ratio provided by the planetary gearing system is within the range of 5.38 to 17.50. Thus, given the rotational input provided to the input shaft 33 by the transmission or transfer case, rotational power is transferred through the system as described to produce a corresponding rotational of the wheel end assembly 34 with the desired speed and torque characteristics. The trunnion socket 86 is adapted to receive a spindle knuckle assembly (not shown) of a double Cardan joint 87 (see FIG. 11) with the king pin positioned proximate to a double Cardan joint. The double Cardan joint accommodates deflection of the wheel end assembly 34 about the king pin while transferring rotational power to the wheel end assembly 34. In particular, the spindle knuckle assembly is positioned within the trunnion socket 86 such that the degrees of freedom provided by the double Cardan joint 87 are preserved as the wheel end assembly 34 of the axle assembly 30 are steered. The double Cardan joint 87 is configured accommodate the extension of the axle assembly 30 between the retracted configuration and the extended configuration.

A track actuator 152 facilities moving of the movable housing 50 between the retracted and the extended configurations. The track actuator 152 of the illustrated embodiment is coupled to the carrier housing 38 and the movable housing 50. As previously expressed, however, known axle assemblies require the steering actuator to extend to compensate for the extension of the track actuator, which may unnecessarily subject the steering actuator to undesirable forces and/or limit the maximum track to which the axle assembly may be extended. The axle assembly 30 of the present disclosure advantageously provides for extending the track of the axle assembly 30 without requiring the compensating extension of the steering actuator 150 and without unduly limiting the maximum track to which the axle assembly 30 may be extended. The aforementioned advantages are facilitated with a mounting assembly 100 and its operation within the context of the axle assembly 30.

Moreover, as mentioned, the axle assembly 30 of FIG. 1 is preferably the front axle with the steering actuator 150 and the track actuator 152 positioned on opposite sides of the axle assembly 30. A rear axle may preferably include the steering actuator 150 and the track actuator 152 positioned on the same side of the axle assembly 30. The movable housing 50 includes mounting features 92 configured to be fixedly coupled with a mounting assembly 100 (see FIG. 8) and/or a mounting fixture 102 (see FIG. 9). The mounting assembly 100 and the mounting fixture 102, in some respects, may be considered interchangeable components each configured to be coupled with the track actuator 152 depending on whether the steering and track actuators 150, 152 are to be on the same or opposite sides in a manner to be further described.

The mounting features 92, in a broadest sense, are configured to be coupled with the mounting assembly 100 and/or the mounting fixture 102. As best shown in FIG. 7, the mounting features 92 extend from the coupling portion 84 of the movable housing 50. The mounting features 92 may include an upper mount 94 having opposing faces 96 with one of the faces 96 in the front direction and another one of the faces 96 in the rear direction. Likewise, the mounting features 92 may include a lower mount 98 having the opposing faces 96 with one of the faces 96 in the front direction and another one of the faces 96 in the rear direction. Each of the faces 96 include bores sized to receive fasteners for coupling one of the mounting assembly 100 and the mounting fixture 102 with the movable housing 50. As to be further described, a generally symmetric arrangement of each of the upper and lower mounts 94, 98 advantageously provides for modularity during assembly, for example, depending on whether the steering actuator 150 and the track actuator 152 are to be disposed on the same or opposite sides of the axle assembly 30.

Figure 8:
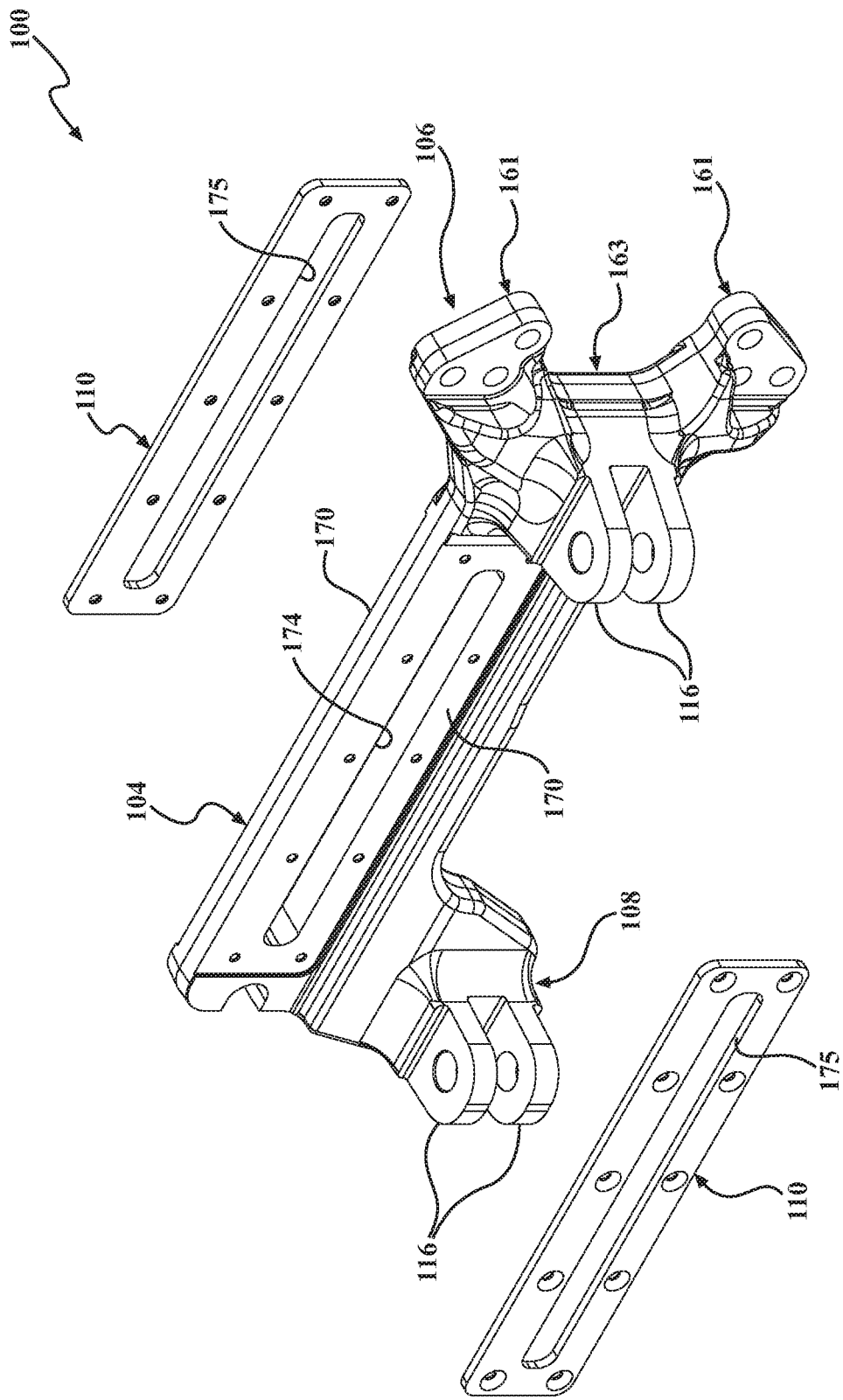
FIG. 8 is an exploded view of the mounting assembly of the axle assembly of FIG. 1.

FIG. 8 shows the mounting assembly 100 including a mounting plate 104, a mounting head 106 extending from the mounting plate 104, a mounting foot 108 extending from the mounting plate 104, and mount bushings 110 coupled to opposing sides 170 at least partially defining the mounting plate 104. The illustrated embodiment shows the mounting plate 104, the mounting head 106, and the mounting foot 108 monolithic and formed of unitary construction, but it is understood these structures may be formed as discrete components to be coupled together through a suitable joining process.

Figure 4A:
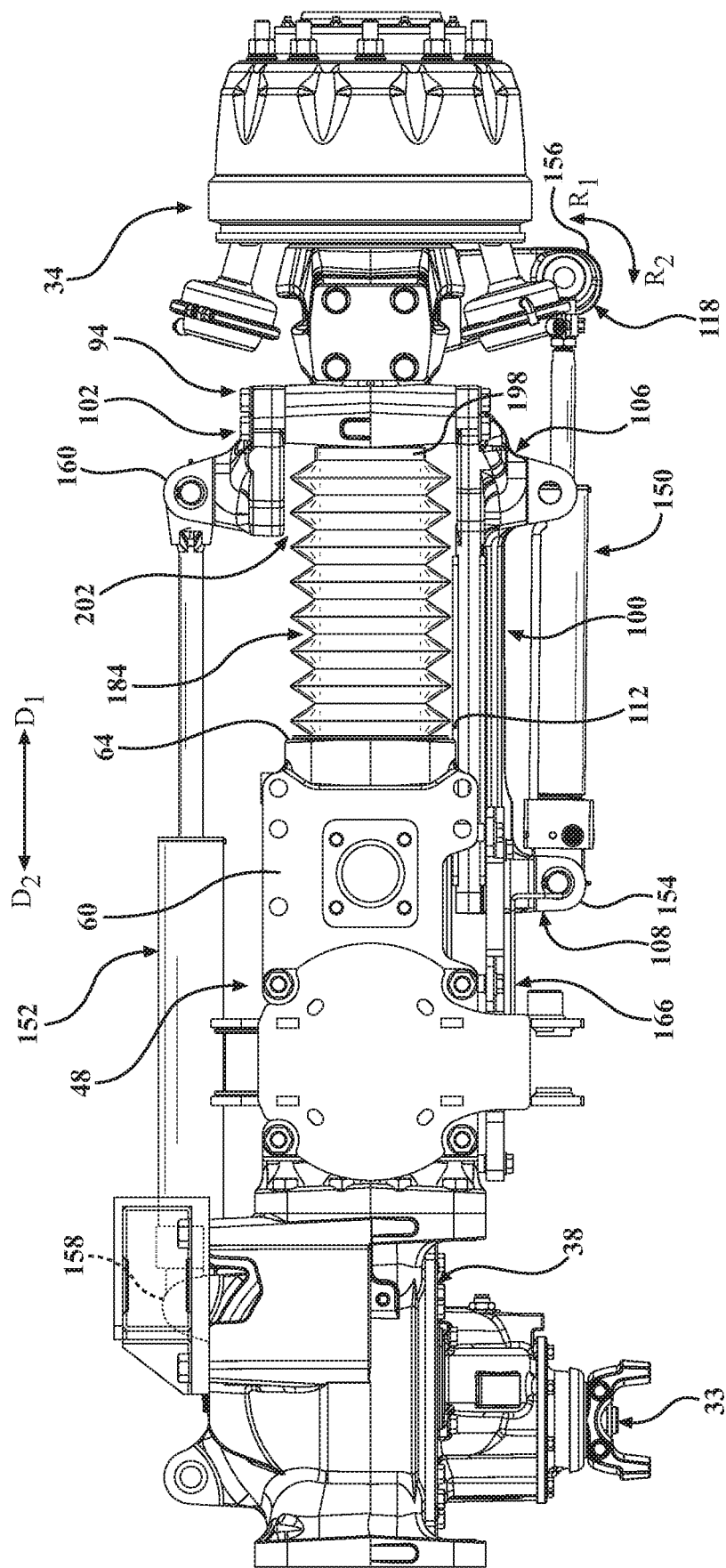
FIG. 4A is a top plan view of a portion of the axle assembly of FIG. 1.
Figure 4B:
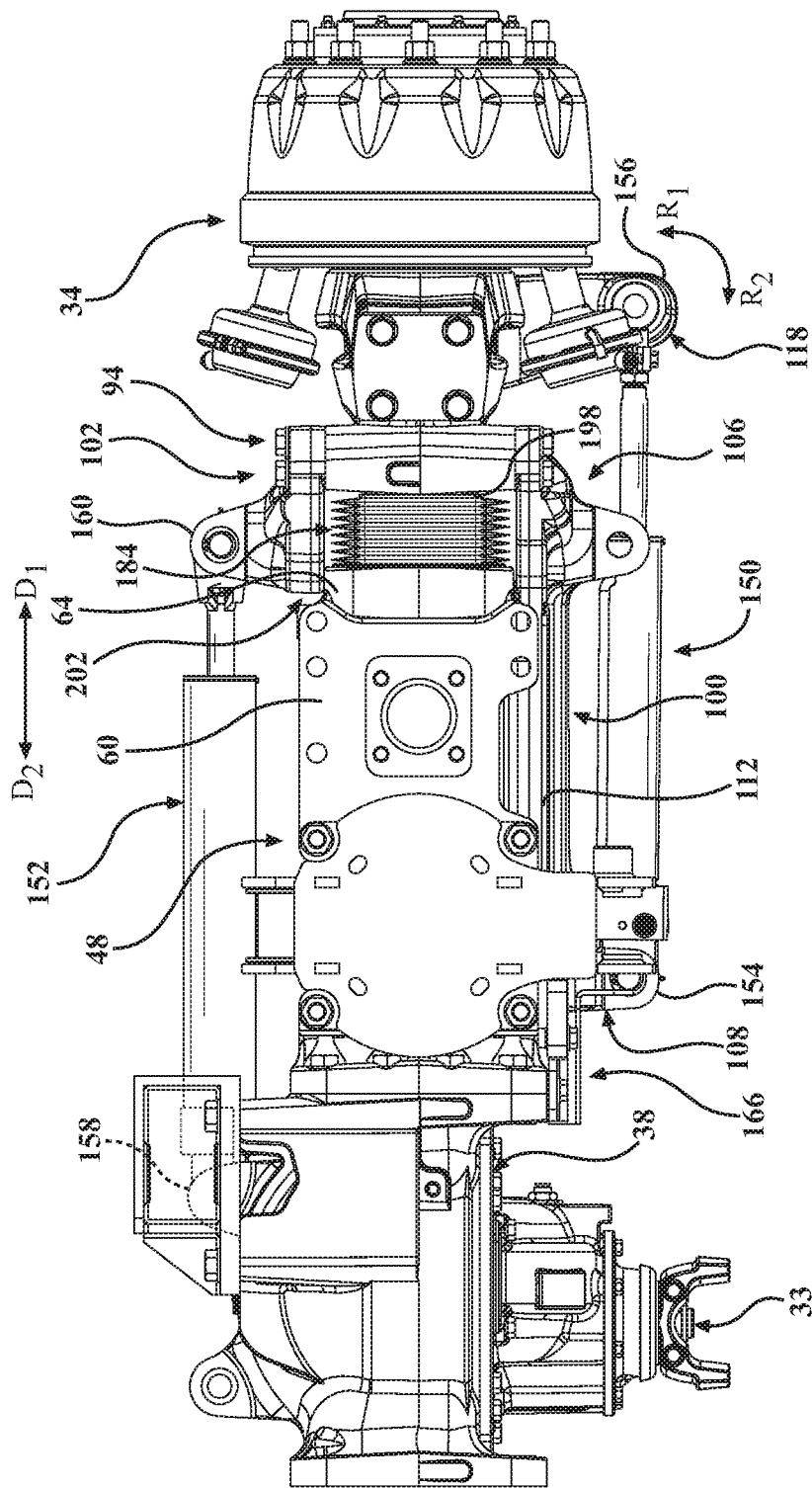
FIG. 4B is a top plan view of a portion of the axle assembly of FIG. 1 with the axle assembly shown in a retracted configuration.

As mentioned, the movable housing 50 moves within the closed channel 54 of the central housing 48 between the retracted configuration and the extended configuration. In the retracted configuration, the wheel end assembly 34 is at a first distance from the central housing 48, for example, the distal end 64 of the central housing 48. In the extended configuration, wheel end assembly 34 is at a second distance from the central housing 48, for example, the distal end 64 of the central housing 48. The second distance is greater than the first distance. FIGS. 4B and 5B show the axle assembly 30 in the extended configuration.

Figure 5A:
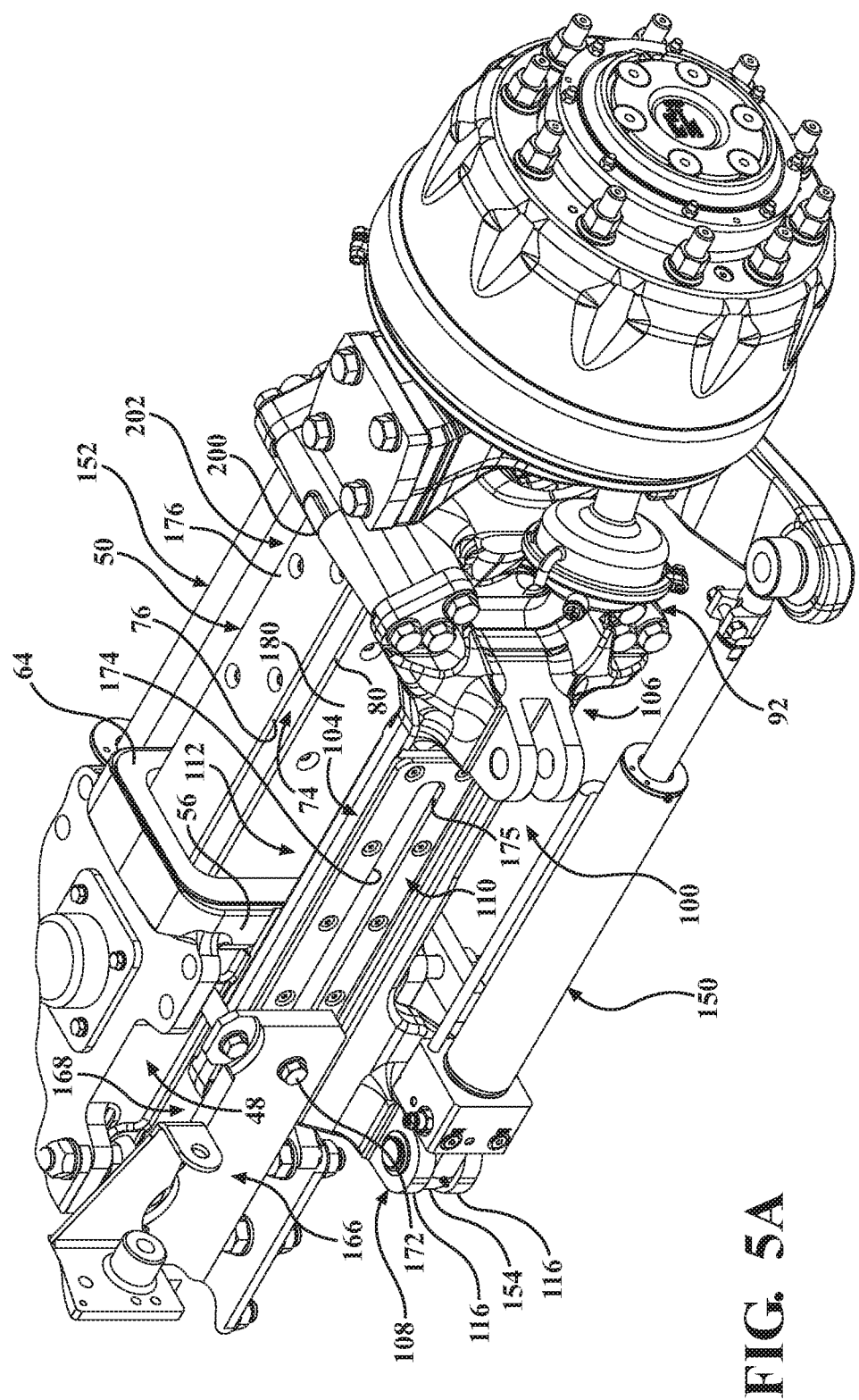
FIG. 5A is a perspective view of a portion of the axle assembly of FIG. 1 detailing a movable housing extending from a central housing, and a steering actuator coupled to a mounting assembly fixed to the movable housing.
Figure 5B:
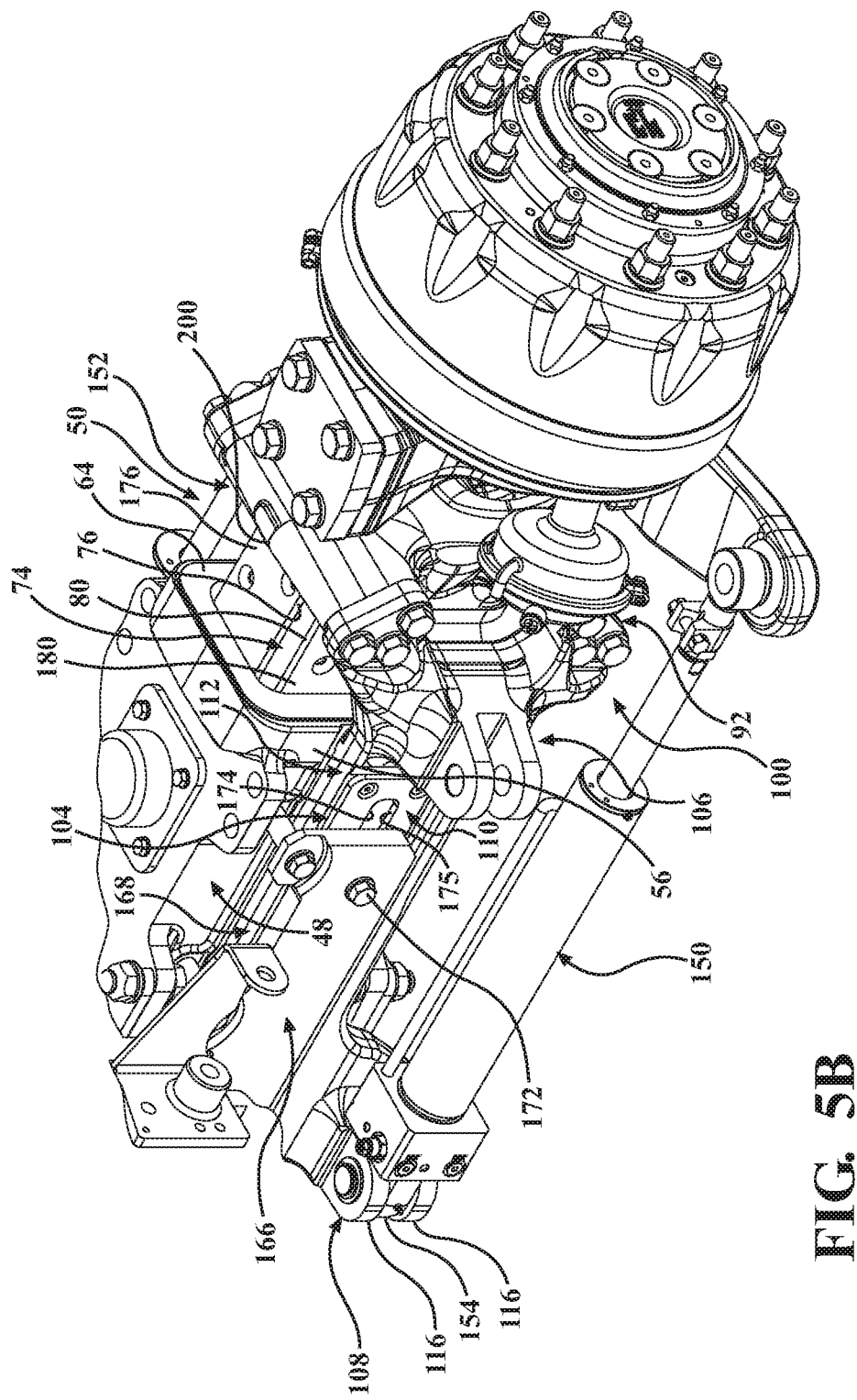
FIG. 5B is a perspective view of the portion of the axle assembly of FIG. 5A with the axle assembly in the retracted configuration.

Referring now to FIGS. 5A and 5B, the mounting fixture 100 is fixedly coupled to the movable housing 50, as mentioned, and in particular to the mounting features 92 of the coupling portion 86 of the movable housing 50. The upper and lower mounts 94, 98 of the mounting features 92 extend outwardly from the coupling portion 86 such that, when the mounting assembly 100 is fixedly coupled to the coupling portion 86, a gap 112 is defined between the mounting assembly 100 and one of the opposing lateral walls 82, 84 of the movable housing 50. A size of the gap 112 is at least equal to a thickness of one of the sidewalls 56 of the central housing 48. The mounting plate 104 may be parallel to the sidewall 56 of the central housing 48. As a result, the mounting plate 104 is spaced apart from one of the opposing lateral walls 82, 84 of the movable housing 50 and slidably positioned adjacent an outer surface of one of the sidewalls 56, 58 of the central housing 48. As the movable housing 50 moves between the retracted and the extended configurations, the mounting assembly 100 fixedly coupled to the movable housing 50 moves in a corresponding manner. The mounting plate 104 slides relative to and adjacent the central housing 48 such that the sidewall 56 of the central housing 48 is received within the gap 112. In other words, the unique configuration of the mounting assembly 100 providing the gap 112 between the mounting plate 104 and the telescoping portion 74 with the gap 112 sized to receive the sidewall 56 of the central housing 48 allows for greater extension of the track of the axle assembly 30 by avoiding interference of those structures.

Furthermore, the steering actuator 150 includes opposing ends 154, 156 coupled to components of the axle assembly 30 such that the steering actuator 150 moves as a unit as the movable housing 50 moves between the retracted and extended configurations. As a result, the steering actuator 100 need not extend to compensate for extension of the track actuator 152, but rather the steering actuator 150 maintains its position (i.e., amount of extension, if any) during movement of the movable housing 50. With continued reference to FIG. 5A and concurrent reference to FIGS. 1, 4A and 4B, a first end 154 of the steering actuator 150 is coupled to the mounting foot 108 of the mounting assembly 100. The mounting foot 108 may include flanges 116 configured to be coupled to the first end 154 of the steering actuator 150. The second end 156 of the steering actuator 150 is coupled to a steering arm 118 of the wheel end assembly 34 to be described. It is readily appreciated that since each of the mounting foot 108 of the mounting assembly 100 and the steering arm 118 of the wheel end assembly 34 move together with movement of the movable housing 50 between the retracted and extended configurations, the opposing ends 154, 156 of the steering actuator 150 move as a unit.

As implied by its name, steering of the vehicle; i.e., deflecting the wheel end assembly 34 at an angle about the pivot axis (P) (e.g., the king pin) is accomplished through controlling the steering actuator 150, such as a hydraulic cylinder or other linear actuator. The first end 154 of the steering actuator 150 is coupled to the mounting assembly 100 proximal the pivot axis (P) and the king pin, and the second end 154 of the steering actuator 150 is coupled to the wheel end assembly 34 distal the pivot axis and king pin. As best shown in FIGS. 1, 4A and 4B, the steering arm 118 may be a plate-like structure extending in the rear direction (R) from the wheel end assembly 34. In certain embodiments, when the steering actuator 150 is moving towards a first position (e.g., the hydraulic cylinder is extending), a force is provided to the steering arm 118 in the distal or first side direction (S1). In other words, the steering arm 118 is urged away from the mounting foot 108. Yet the steering arm 118 and the wheel end assembly 34 are axially constrained by the king pin with the connection between the steering actuator 150 and the steering arm 118 offset rearwardly relative to the king pin. The arrangement results in the wheel end assembly 34 pivoting in a first rotational direction (R1) about the king pin in the view shown in FIG. 4A, thus turning the wheel end assembly 34 to the left. Conversely, when the steering actuator 150 is moving towards a second position (e.g., the hydraulic cylinder is retracting), a force is provided to the steering arm 118 in the proximal or the second side direction (S2). In other words, the steering arm 118 is urged or drawn towards the mounting foot 108. The aforementioned constraints result in the wheel end assembly 34 pivoting in a second rotational direction (R2) about the king pin in the view shown in FIG. 4A, thus turning the wheel to the right. Further, the steering actuator 150 may be positioned in a third position or neutral position intermediate the first and second positions (e.g., the hydraulic cylinder is partially extended) in which the wheel end assembly 34 is generally oriented "straight," or in a manner in which the vehicle moves without turning. It is understood that the steering actuator 150 may provide an infinite number of intermediate positions between the first and second positions to impart the desired steering of the wheel end assembly 34. Furthermore, and with reference to FIG. 1, the steering actuator 150' counterpart to the steering actuator 150 may operate in a coordinated manner in order to coordinate movement of the wheel ends assemblies 34, 34' and turn the vehicle. The steering actuators 150, 150' are independently operable and may both be positioned in the first position or the third position such that the wheel end assemblies 34, 34' are angled towards one another ("toe in") or away from one another ("toe out"), respectively, in order to adjust the track of the vehicle in a manner to be described.

As introduced thus far throughout the present disclosure, advantageous features of the axle assembly 30 provides for moving the axle assembly 30 between the retracted configuration (or the first configuration) and the extended configuration (or the second configuration). In the retracted configuration the wheel end assemblies 34, 34' are at a first track, and in the extended configuration the wheel end assemblies 34, 34' are at a second track. In other words, in the retracted configuration the wheel end assemblies 34, 34' are separated by a first distance, and in the extended configuration the wheel end assemblies 34, 34' are separated by a second distance with the first distance being less than the second distance. Referring now to 1-5, the track actuators 152, 152', such as a hydraulic cylinder or other linear actuator, adapted to selectively move the axle assembly 30 between the retracted configuration and the extended configuration, and any number of configurations there between. The track actuator 152 provides position control to locate the wheel end assembly 34 the desired track, and further provides lock control to maintain the wheel end assembly 34 at the desired track. As best shown in FIG. 2, a first end 158 of the track actuator 152 is coupled to the carrier housing 38, and a second end 160 opposite the first end 158 of the track actuator 152 is coupled the mounting fixture 102. As mentioned, the mounting fixture 102 is fixedly coupled the movable housing 50. It is also contemplated that in an alternative embodiment, the first end 158 of the track actuator 152 may be coupled to a suitable location on the central housing 48.

Figure 9:
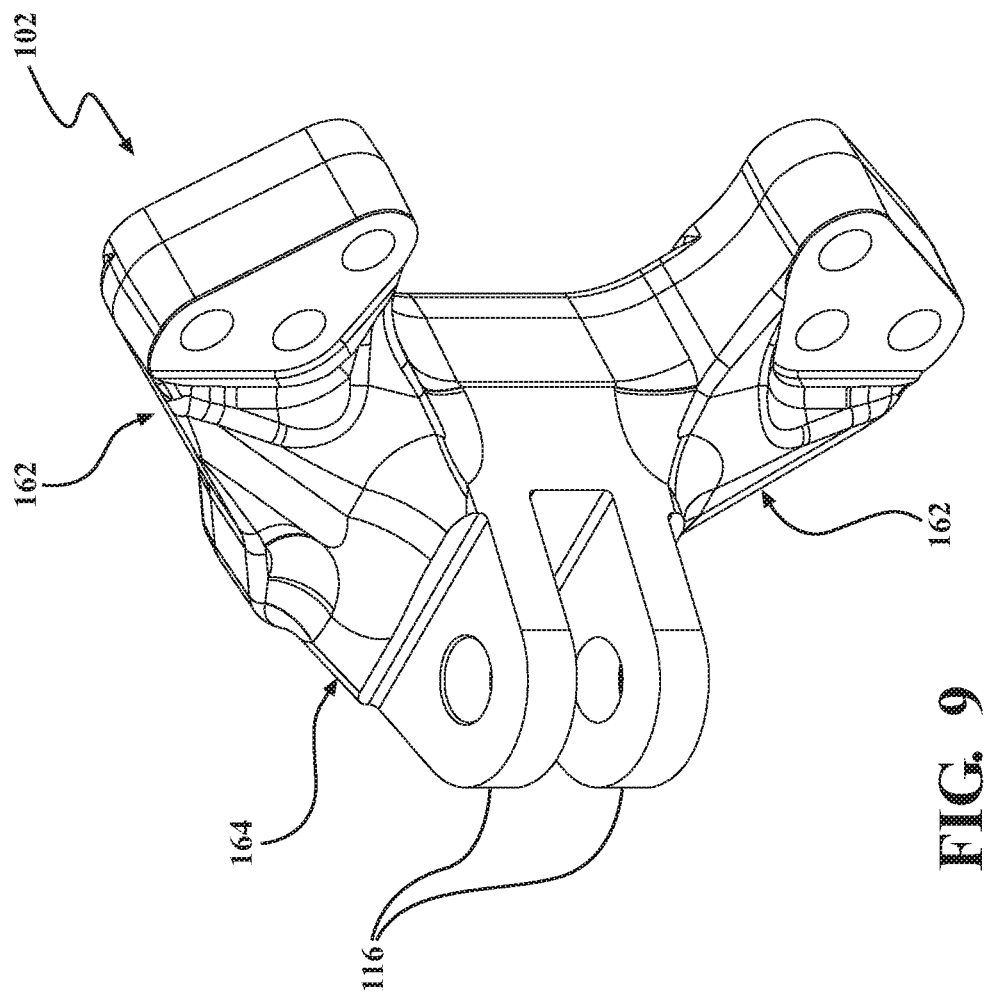
FIG. 9 is a perspective view of a mounting fixture.

FIG. 9 shows the mounting fixture 102, and it is readily appreciated that the mounting fixture 102 may be at least similar in construction as the mounting head 106 of the mounting assembly 100, as shown in FIG. 8. The similar construction facilitates the modularity of coupling the steering actuator 150 and the track actuator 152 in a desired arrangement, as previously mentioned and to be further described. More specifically, the mounting fixture 102 of the illustrated embodiment is generally U-shaped with leg portions 162 separated by a body portion 164. The leg portions 162 are configured to be secured to the mounting features 92 of the coupling portion 86 of the movable housing 50, and in particular one of the leg portions 162 is coupled to the upper mount 94, and the other one of the leg portions 162 is coupled to the lower mount 98. The body portion 164 includes the flanges 116 configured to be coupled to the second end 160 of the track actuator 152. As best shown in the plan views of FIGS. 4A and 4B, the mounting fixture 102 may be fixedly coupled to the coupling portion 86 opposite the mounting head 106 of the mounting assembly 100. With the track actuator 152 coupled to the mounting fixture 102 and the steering actuator 150 coupled to the mounting assembly 100, the track actuator 152 and the steering actuator 150 may be positioned on opposite sides of the movable housing 50.

With the first end 158 of the track actuator 152 coupled to the carrier housing 38, and a second end 160 of the track actuator 152 coupled the mounting fixture 102, actuation of the track actuator 152 imparts movement of the movable housing relative the carrier housing 38 (and thus the central housing 48). In operation, the telescoping portion 74 of the movable housing 50 may be substantially recessed or positioned within the closed channel 54 of the central housing 48. The track actuator 152 is moved from the first position to a second position (e.g., the hydraulic cylinder is extended), and a force is provided by the track actuator 152 on the mounting fixture 102 in the distal or first side direction (S1). The movable housing 50 fixed to the mounting fixture 102 is urged in a first direction (D1). The telescoping portion 74 slidably moves within the closed channel 54 of the movable housing 50 with a corresponding translation of the wheel end assembly 34 that is axially constrained to the movable housing 50. The axle assembly 30 assumes the expanded configuration. It is understood that the track actuator 152 may provide an infinite number of intermediate positions between the first and second positions. The above method may be performed in reverse to move the axle assembly 30 from the expanded configuration to the retracted configuration. Furthermore, it is understood that the track actuator 152' counterpart to the track actuator 152 described immediately above may operate in the same manner in order to coordinate movement of the wheel end assemblies 34, 34' between the retracted and expanded configurations. The track actuators 152, 152' may operate independently and/or in unison.

As previously mentioned, the steer actuator 150 moves as a unit relative to the central housing 48 as the axle assembly 30 moves between the retracted and extended configurations. In other words, the position of the steer actuator 150 is preserved as the track actuator 152 moves between the first and second positions. Not only is vehicle control simplified, but also the frequency or extent to which the steer actuator 150 is in the second position (e.g., the hydraulic cylinder is expanded) is lessened, thereby mitigating some of consequences that demanding operating conditions may have on an expanded hydraulic cylinder (e.g., vibration and/or impact forces). Further, the operation of the steer actuator 150 and the track actuator 152 may be coordinated or independent. The steer actuator 150 may be in the first or second positions (i.e., wheel end assemblies 34, 34' angled to turn the vehicle) with the track actuator 152 in the first and/or second positions. Likewise, the track actuator 152 may be moved between the first and second positions with the steering actuator 150 in the first, second, and/or third positions.

As is readily appreciated from the foregoing disclosure, the vehicle on which the axle assembly 30 is to be installed may encounter demanding operating conditions. As is further readily appreciated from FIGS. 5A and 5B, the connection point between the mounting assembly 100 and the movable housing 50 is spaced apart from the connection point between the mounting assembly 100 and the steering actuator 150 (i.e., by a distance approximate a length of the mounting assembly 100). Such an arrangement, absent additional components, may result in undesirable loads on the mounting assembly 100, and more particularly the mounting plate 104. The axle assembly 30 overcomes the aforementioned challenges with a track assist bracket 166. With continued reference to FIGS. 5A and 5B, the track assist bracket 166 is fixedly coupled to at least one of the sidewalls 56 of the central housing 48. The track assist bracket 166 is spaced apart from the sidewall 56 to define a gap 168. The gap 168 is sized to receive the mounting plate 104 as the movable housing 50, and thus the mounting assembly 100 including the mounting plate 104, moves between the retracted and the extended configurations. The gap 168 is sized to be at least equal to a thickness of the mounting plate 104 defined between the opposing sides 170. In such an arrangement, the track assist bracket 166 supports the opposing sides 170 of the mounting plate 104, thereby limiting lateral deflection and associated bending loads.

Moreover, a reinforcement member 172 may further support the mounting plate 104 as the mounting plate 104 slidably moves within the gap 168. With continued reference to FIGS. 5A and 5B and concurrent reference to FIG. 8, the mounting assembly 100 defines a slot 174 extending through the opposing sides 170 of the mounting plate 104. The slot 174 may be elongate and oriented lengthwise along the length of the mounting plate 104. The reinforcement member 172 may be at least one of the structures coupling the track assist bracket 166 to the sidewall 58 of the central housing 48. FIGS. 5A and 5B shows the reinforcement member 172 sized to be snugly and slidably received through the slot 174. As a result, the reinforcement member 172 supports the mounting assembly 100 in at least two directions (e.g., up and down) as the movable housing 50, and thus the mounting assembly 100 including the mounting plate 104, moves between the retracted and the extended configurations. The combined effect of the track assist bracket 166 and the reinforcement member 172 may restrict the mounting plate 104 from moving relative to the central housing 48 in five degrees of freedom, thereby constraining movement of the mounting assembly 100 to sliding in the first and second directions (D1, D2). The arrangement not only limits the loads imposed on the mounting assembly 100, but also facilitates guided movement of key components of axle assembly 30 as the track width is selectively adjusted.

With the mounting plate 104 disposed within the gap 168 (e.g., sandwiched between the track assist bracket 166 and the sidewall 56 of the central housing 48), one or more of the previously mentioned mount bushings 110 may be provided to facilitate smooth movement of the mounting plate 104 relative to the track assist bracket 166 and the central housing 48. Referring to FIGS. 5A, 5B and 8, the mounting assembly 100 includes the mount bushings 110 disposed on the opposing sides 170 of the mounting plate 104. The mount bushings 110 may be plate-like structures sized to cover substantially an entirety of the opposing sides 170. The sides 170 may include a recess with a depth corresponding to a thickness of the mount bushings 110. The mount bushings 110 define a slot 175 corresponding to the slot 174 extending through the mounting plate 104. As a result, with the mount bushings 110 fixedly coupled to the opposing sides 170 of the mounting plate 104, the reinforcement member 172 extends through the slots 174, 175 to function in the manner previously described. The mount bushings 110 are preferably formed of materials with the requisite hardness, surface finish, and/or wear-resistant properties, among others, to meet the demands of the application of the vehicle. As examples only, the mount bushings 110 may be formed of GGB-CBM bronze, Delrin 100KM, CIP151 composites, $MoS_2$ metal coating, Nylatron, Ketron CA30, FibreComp BMC, WearComp, STA-14-858, and the like.

In the illustrated embodiment and as mentioned, the telescoping portion 74 of the movable housing 50 generally defines a cross-sectional profile sized to be snugly and slidably received within the closed channel 54 of the central housing 48 having a complementary cross-sectional profile. Among other advantages, the complementary square cross-sectional prevent rotation of the movable housing 50 relative to the central housing 48 during operation of the axle assembly 30. In other words, inherent to the movable housing 50 with the square cross section being snugly and slidably positioned within the closed channel 54 with the square cross section is that the movable housing 50 is maintained in rotational alignment with the central housing 48. If, by contrast and for example, each of the cross sections of the central housing 48 and the movable housing 50 were circular, additional means of preventing rotation between the housings would be required. Yet, incidental contact between the central housing 48 and the movable housing 50 may occur due to their cross sections. Consequently, the axle assembly 30 may include one or more bushings 176-182 adapted to reduce friction between the central housing 48 and the movable housing 50. Referring to FIGS. 7 and 8, the bushings 176-182 may be coupled to each of walls 76-82 of the telescoping portion 74 of the movable housing 50. In particular, an upper bushing 176 may be fixedly coupled to the upper wall 76, a lower bushing 178 may be fixedly coupled to the lower wall 78, a lateral bushing 180 may be fixedly coupled to one of the lateral walls 80, and the lateral bushing 182 other may be fixedly coupled to the other lateral wall 82. In other embodiments, one, two or three of bushings may be coupled to one, two, or three walls of the movable housing 50.

The bushings 176-182 are suitably shaped to reduce friction in the retracted configuration, extended configuration, and intermediate configurations of the axle assembly 30. The bushings 176-182 are configured to be in sliding engagement with inner surfaces of the walls 76-82 with the inner surfaces defining the closed channel 54. In the illustrated embodiment, each of the bushings 176-182 is a singular plate substantially covering an entirety of a respective one of the walls 76-82. In certain embodiments, the bushings 176-182 may have suitable length such that when the movable housing 50 is in both the retracted and extended configurations, at least a portion of the bushings 176-182 is positioned between the movable housing 50 and the central housing 48 to maintain a frictional barrier there between. In other words, when at least a portion of the bushings 176-182 extends beyond the distal end 64 of the central housing 48 (see FIG. 5A) when the movable housing 50 is in the extended configuration, and at least a portion of the bushings 176-182 remain within the closed channel 54 of the central housing 48. In one variant, the bushings 176-182 may be coupled to the inner surfaces of the central housing 48 within the closed channel 54 (as opposed to the walls 76-82 of the movable housing 50). It is understood that affixing the bushings 176-182 to the movable housing 50 provides for ease of assembly and servicing with the axle assembly 30. The bushings 78 are preferably formed of materials with the requisite hardness, surface finish, and/or wear-resistant properties, among others, to meet the demands of the application of the vehicle. As examples only, the bushings 176-182 may be formed of GGB-CBM bronze, Delrin 100KM, CIP151 composites, $MoS_2$ metal coating, Nylatron, Ketron CA30, FibreComp BMC, WearComp, STA-14-858, and the like.

As mentioned, the axle assembly 30 may be particularly well suited for agricultural operations. The operating conditions of agricultural vehicles often are demanding, including significant exposure to particulate such as dirt, dust, fertilizers, seeds, and the like. Of particular concern are the impact forces from stalks of rows of plants of sufficient height, which may, over time, result in more than minimal wear and damage to exposed components of the axle. Likewise, ingress of particulates from the operating environment is of particular concern. As mentioned above, at least a portion of the bushings 176-182 may extend beyond the distal end 64 of the central housing 48 when the movable housing 50 is in the extended configuration, thereby exposing those portions of the bushings 176-182. The axle assembly 30 the present disclosure advantageously minimizes exposure of certain components and further minimizes ingress of particulate into the closed channel 54 and the interface between the central and movable housings 48, 50. Referring now to FIGS. 1-4B and 10, the axle assembly 30 may include bellows 184, 184'. The bellows 184 are adapted to expand from and return to a natural state as the axle assembly 30 moves between the expanded and retracted configurations, respectively. In one example, the bellows 184 is formed from concertinaed material, such as thermo-formed plastic, but other suitable materials are contemplated (e.g., composites, polymers, etc.).

The bellows 184 includes opposing ends 186, 188 with a first end 186 coupled to the central housing 48, and a second end 188 coupled to the movable housing 50. The bellows 184 is formed from concertinaed sides 190 defining a passageway 192. The bellows 184 defines a first aperture (not shown) at the first end 186, and a second aperture 194 at the second end 188 with the apertures opening into and at least partially defining the passageway 192. As best shown in FIG. 3, the passageway 192 is sized to receive the movable housing 50, and in particular the telescoping portion 74 of the movable housing 50. Thus, in the illustrated embodiment, the passageway is substantially square in cross section.

Figure 10:
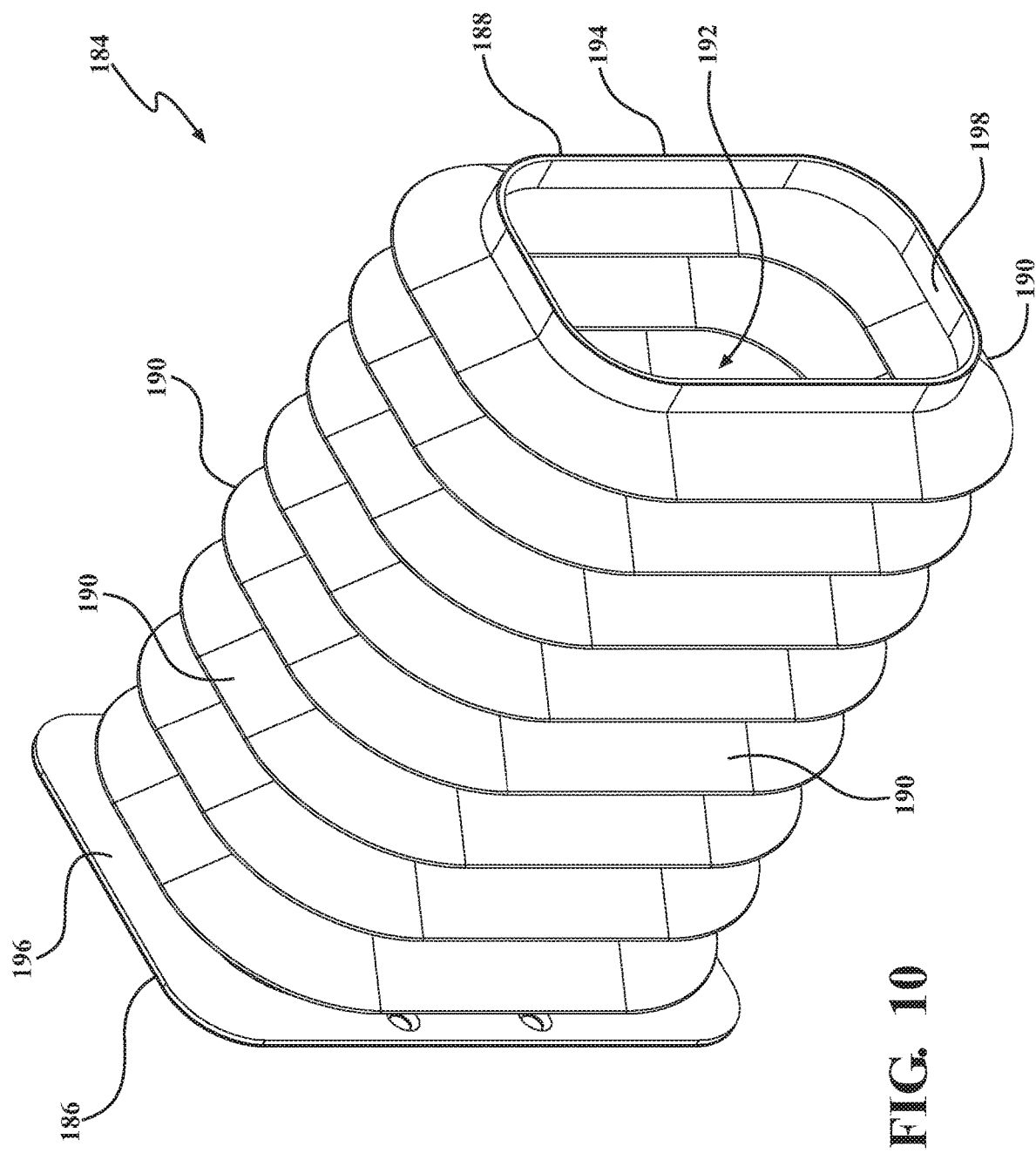
FIG. 10 is a perspective view of bellows.

FIG. 10 shows the bellows 184 including a first lip 196 at least partially defining the first end 186. The first lip 196 is sized and shaped to be fixedly coupled flat-on-flat to the distal end 64 of the central housing 48 with a suitable joining means such as a fastener. The bellows 184 may include a second lip 198 at least partially defining the second end 188. The second lip 198 may extend around a collar 200 of the movable housing 50 generally defining an interface between the telescoping portion 74 and the coupling portion 84 (see FIGS. 5A, 5B and 7). A clamp may fixedly couple the second lip 198 to the collar 200. Alternative joining means may include adhesives, interference fit, friction fit, and the like. Each of the ends 186, 188 of the bellows 184 is secured in a manner that prevents ingress of particulate that may degrade movement of the movable housing 50 within the central housing 48. In particular, the bellows 184 are adapted to prevent particulate from coming into contact with the bushings 176-182 coupled to the movable housing 50. With movable housing 50 received within the passageway 192 of the bellows 184, the exposed portions of the bushings 176-182 with the axle assembly 30 in the expanded configuration are entirely enclosed within the bellows 184. It is contemplated that the second end 188 of the bellows 184 may be coupled to the wheel end assembly 34 as an alternative of or in addition to the movable housing 50. It is further contemplated that the first lip 196 may be constructed similar to the second lip 198 with the first lip 196 sized and shaped to extend around the central housing 48 and secured with a clamp. In such a variant, the first end 186 of the bellows 184 may define a first cross sectional area, and the second end 188 of the bellows 184 may define a second cross sectional area less than the first cross sectional area.

With the bellows 184 coupled to the central and movable housings 48, 50, one of the sides 190 of the bellows 184 may be positioned within the gap 112 defined between the mounting assembly 100 and one of the opposing lateral walls 82, 84 of the movable housing 50. Another one of the sides 190 of the bellows 184 may be positioned within a gap 202 defined between the mounting assembly 100 and the mounting fixture 102. Further, as is readily appreciated, each of the steering actuator 100 and the track actuator 102 are disposed external to the passageway 192 of the bellows 184. As a result, the interior passageway 46 extending through the central and movable housings 48, 50 may receive the drive shaft 40 and therefore eliminate exposure of the drive shaft 40 from the environmental conditions.

Figure 11:
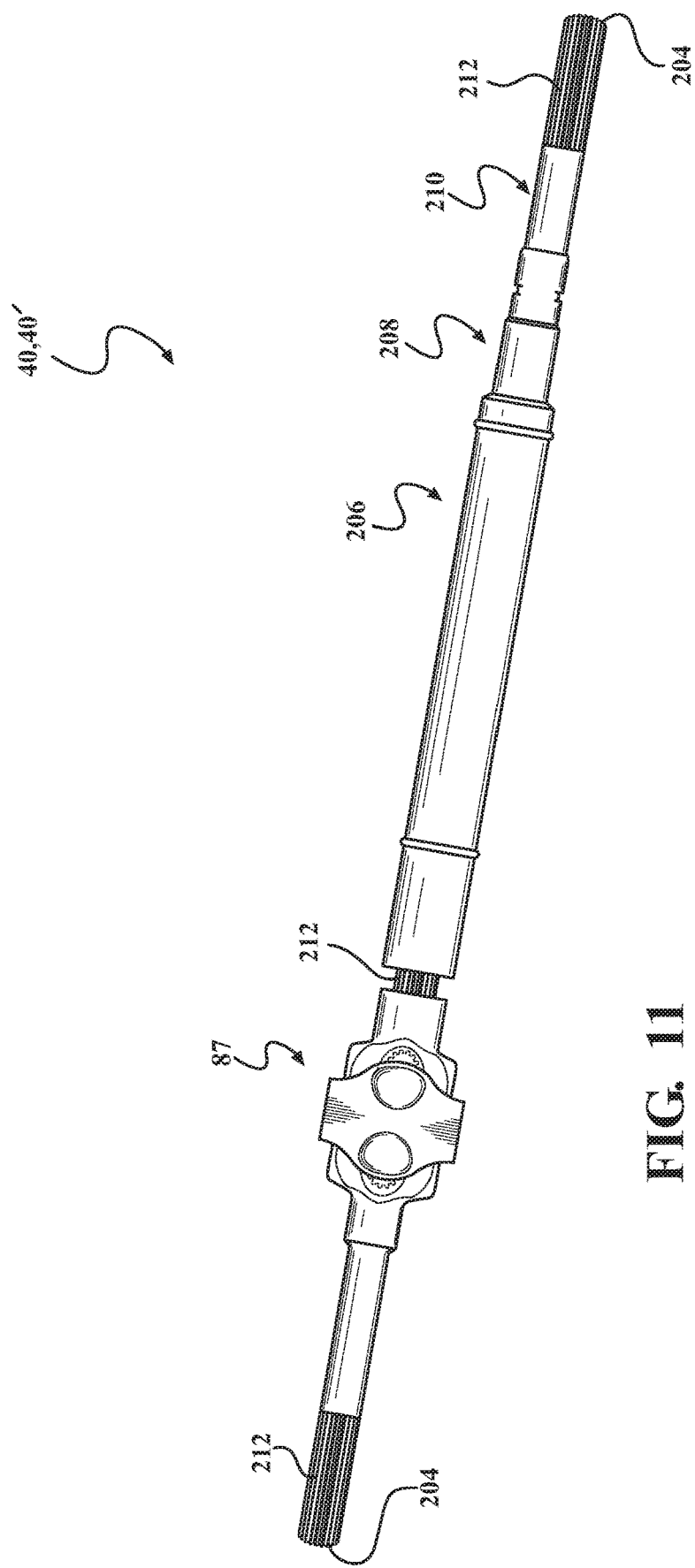
FIG. 11 is a perspective view of a drive shaft for the axle assembly of FIG. 1.

Referring now to FIG. 11, the drive shaft 40, 40' is configured to adjust as the movable housing 50 moves between the retracted and extended configurations. The drive shaft 40 includes a length defined between the opposing ends 204, and a plurality of telescoping shaft sections 206-210 (three shown) between the opposing ends 204. The telescoping shaft sections 206-210 are rotatable fixed relative to one another with splines 212, and the splines 212 provide for the telescoping shaft sections 206-210 to be axially movable relative to one another. The telescoping shaft sections 206-210 permit a length of the drive shaft 40 to be lengthened or shortened in response to the axle assembly 30 moving between the retracted configuration and the extended configuration. The splines 212 are configured to provide for adjustment of the length of the drive shaft 40 while transmitting torque between the opposing ends 204 as the movable housing 50 moves between the retracted and extended configurations. Splines 212 may also be provided at the opposing ends 204 of the drive shaft 40, as shown in the illustrated embodiment. Certain known axles undesirably require interleaving or overlapping of the left and right portions of the axle assembly (e.g., the movable housings 50, 50') in order to maximize the track width of the axle assembly; however, such axles are incompatible with, for example, the differential 36 and first and second drive shafts 40, 40' of the axle assembly 30. Therefore, the first and second movable housings 50, 50' being independently movable relative to the first and second central housings 48, 48', respectively, with the drive shaft 40, 40' extending through a respective the interior passageways 46, 46' is still another advantageous feature of the axle assembly 30 of the present disclosure.

As mentioned, the arrangement of each of the upper and lower mounts 94, 98 in combination with similar structural characteristics of the mounting head 106 and the mounting fixture 102 advantageously provides alternative configurations depending on whether the steering actuator 150 and the track actuator 152 are to be disposed on the same or opposite sides of the axle assembly 30. An exemplary alternative configuration will be described with reference to FIGS. 2 and 5A in which the steering actuator 150 and the track actuator 152 are disposed on the same side of the axle assembly 30. In the exemplary alternative configuration, it is assumed the steering arm 118 extends from the wheel end assembly 34 in the rear direction (R). FIG. 2 shows the track actuator 150 coupled to the carrier housing 38 and the mounting fixture 102. During assembly or service, the mounting fixture 102 may be decoupled from the mounting features 92 of the movable housing 50 and replaced with the mounting assembly 100. The mounting head 106 of the mounting assembly 100 includes similar structural characteristics as the mounting fixture 102, namely a generally U-shaped structure with leg portions 161 separated by a body portion 163. The mounting head 106 may be coupled to the upper and lower mounts 96, 98 of the coupling portion 84 such that the mounting assembly 100 is fixedly coupled to the movable housing 50. The steering actuator 150 may be coupled to the mounting foot 108 and the steering arm 118, as previously described, and the track actuator 152 may be coupled to the mounting head 106 and the carrier housing 38. In such a configuration, one end of each of the steering actuator 150 and the track actuator 152 are coupled to the mounting assembly 100. The modularity of the axle assembly 30 with alternative positioning of one or both of the steering actuator 150 and the track actuator 152 may provide the axle assembly 30 to be designed according to specifications of the intended application.

Figure 12:
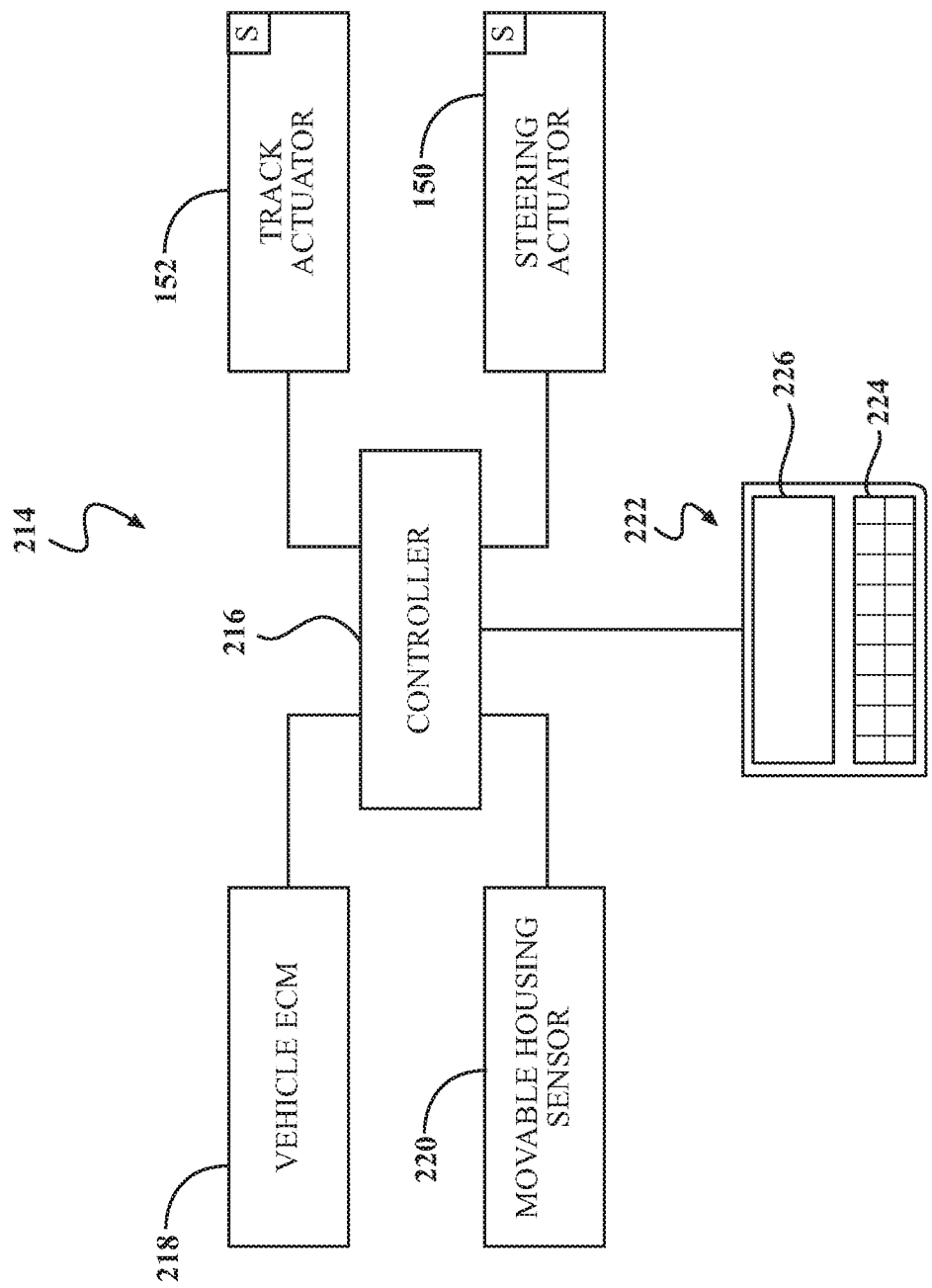
FIG. 12 is a schematic representation of a control system of the axle assembly of FIG. 1.

The operation of the axle assembly 30 may be electronically controlled. FIG. 12 shows a schematic diagram of an exemplary control system 214. The control system 214 may include a controller 216 in electronic communication with an electronic control module (ECM) 218 of the vehicle. Each of the steering actuator 150 and the track actuator 152 may include at least one sensor (S) in electronic communication with the controller 216. The sensor(s) may be configured to provide a signal to the controller 216 as to the position (i.e., an amount of extension relative to a reference) of the steering actuator 150 and the track actuator 152. A sensor 220 may be coupled to at least one of the central housing 48 and the movable housing 50 to provide a signal to the controller 216 as to the position of the movable housing 50 relative to the central housing 48 or another reference structure. The sensor 220 may be optional and the position of the movable housing 50 may be calculated by the controller 216 based on the positions of the steering actuator 150 and the track actuator 152. The control system 214 may include a user interface 222 including an input device 224 and an output device 226. The user interface 222 may be installed at a suitable location on the vehicle, for example, within a cabin designed to accommodate the operator of the vehicle. The input device 224 and the output device 226, as implied by their names, are configured to receive and display an input from and an output to the operator, respectively. The input device 224 may include one or more buttons, for example, a keyboard, and the output device 226 may be a display. The input device 224 and the output device 226 may be integrated on a touchscreen. In one variant, the touchscreen is embodied on a mobile device remote from the vehicle providing for remote control of the axle assembly 30.

Improved methods of utilizing the axle assembly 30 of the present disclosure to adjust the track of the vehicle will now be described. The track actuator 152 moves between the first and second positions to move the axle assembly 30 between the retracted and extended configurations to adjust the track of the vehicle. It is noted that the track actuator 152 overcomes shortcomings with mechanically adjustable axles that require adding spacers, changing tires, driving in an "S-pattern" with the axles unlocked such that centripetal forces urge the wheels and the axles outwardly, among others.

For convention, it is considered that a left wheel is coupled to one of the wheel end assemblies 34' of FIG. 1, and a right wheel is coupled to the other one of the wheel end assemblies 34 with the vehicle to be moving forward in the forward direction (F). Exemplary embodiments of the axle assembly 30 of the present disclosure may provide for a "toe in, toe out" ("TITO") operation to adjust the track of the vehicle. In the toe out operation, the intention is to widen the track of the vehicle such that the wheels are spaced farther part. In other words, during the toe out operation, the axle assembly 30 moves from the retracted configuration (or an intermediate configuration) to the extended configuration (or another intermediate configuration) such that the width between the wheel end assemblies 34, 34' increase. In one exemplary method of the toe out operation, the left wheel and the right wheel are angled outwardly relative to one another. Namely, the steering actuator 150 is actuated to provide a force to the steering arm 118 that results in the right wheel pivoting in the first rotational direction (R1) (see FIG. 4A), thus turning the right wheel to the left. Consecutively or concurrently, the steering actuator 150' associated with the left wheel is actuated to provide a force to the steering arm 118' that results in the left wheel pivoting in the second rotational direction (R2), thus turning the left wheel to the right. The steering of the wheels may occur with the vehicle at rest or in motion.

Consecutively or concurrently with angling the left and right wheels outwardly relative to one another, the track actuators 152, 152' are "unlocked," "disabled," or otherwise placed in a state where the track actuators 152, 152' may freely move between the first and second positions under the influence of external forces. For example, the hydraulic cylinders may have a valve that is opened in order to permit the hydraulic cylinders to expand or contract under the influence of forces axial to the hydraulic cylinder itself.

With the left and right wheels angled outwardly relative to one another, and with the track actuators 152, 152' moving freely, the vehicle is put into a forward motion or continues its forward motion. A lateral force vector at the wheel patch urges the wheels outwardly as the vehicle moves forward. In certain embodiments, the wheels are angled by at least five, ten, fifteen or more degrees in order to have the lateral force vector overcome the sliding forces of the wheel. The sensors previously described may monitor the position of the wheels. Once the wheel end assemblies 34, 34' are in the intended position corresponding to the desired track of the vehicle, the track actuators 152, 152' are "locked," "enabled," or otherwise placed in a state where the track actuators 152, 152' cannot move under the influence of external forces. The wheels are locked in position at the desired track of the vehicle.

Consecutively or concurrently with the wheels being locked in position at the desired track of the vehicle, the wheels are steered in a manner such that the left and right wheel return to being parallel for conventional maneuvering of the vehicle. For example, the steering actuators 150, 150' may move to the third or neutral position such that the wheel are oriented generally "straight." It is also contemplated that the wheel may begin straightening out prior to the wheels locking into place, in which case the wheel traverse a highly exaggerated S-shaped path during the toe out operation.

The above exemplary method may be considered a "passive" toe out operation in which the forces moving the wheel outwardly are limited to the lateral force vectors from the ground during motion of the vehicle. In an "active" toe out operation, the lateral force vectors from the ground during motion of the vehicle are supplemented by the track actuators 152, 152'. The vehicle in motion providing the lateral force vectors with the wheels angled outwardly, the required forces to move the wheels are greatly reduced. The controller 212 may be in communication with sensors S associated with each of the steering actuators 150, 150', the track actuators 152, 152', as well as the ECM 88 of the vehicle (see FIG. 12). The controller 212 is adapted to receive data from the sensors S, 220, such as the speed of the vehicle, angle of the wheels, position of the wheel end assemblies 34, 34', and the like, to determine the appropriate movement of the track actuators 152, 152' during the active toe out operation.

In many respects the "toe in" operation is the reverse of the toe out operation. More specifically, in the toe in operation, the intention is to narrow the track of the vehicle such that the wheels are spaced closer together. In other words, during the toe in operation, the axle assembly 30 moves from the expanded configuration (or an intermediate configuration) to the retracted configuration (or another intermediate configuration) such that the width between the wheel end assemblies 34, 34' decreases. In one exemplary method of the toe in operation, the left wheel and the right wheel are angled inwardly relative to one another in a manner previously described. Namely, the steering actuator 150 associated with the right wheel is actuated to provide a force to the steering arm 118 that results in the right wheel pivoting in the second rotational direction (R2), thus turning the right wheel to the right. Consecutively or concurrently, the steering actuator 150' associated with the left wheel is actuated to provide a force to the steering arm 118' that results in the left wheel pivoting in the first rotational direction (R1), thus turning the left wheel to the left. The steering of the wheels may occur with the vehicle at rest or in motion.

Consecutively or concurrently with angling the left and right wheels inwardly relative to one another, the track actuators 152, 152' are "unlocked," "disabled," or otherwise placed in a state where the track actuators 152, 152' move freely between the first and second positions freely under the influence of external forces. For example, the hydraulic cylinders may have a valve that is opened in order to permit the hydraulic cylinders to expand or contract under the influence of forces axial to the hydraulic cylinder itself.

With the left and right wheels angled inwardly relative to one another, and with the track actuators 152, 152' moving freely, the vehicle either is put into a forward motion or continues its forward motion. A lateral force vector at the wheel patch urges the wheels inwardly as the vehicle moves forward. Once the wheel end assemblies 34, 34' are in the intended position corresponding to the desired track of the vehicle, the track actuators 152, 152' are "locked," "enabled," or otherwise placed in a state where the track actuators 152, 152' cannot move under the influence of external forces. The wheels are locked in position at the desired track of the vehicle.

Consecutively or concurrently with the wheel being locked in position at the desired track of the vehicle, the wheel are steered in a manner such that the left and right wheel return to being parallel for conventional maneuvering of the vehicle. For example, the steering actuators 150, 150' may move to the third or neutral position such that the wheel and are oriented generally "straight." It is also contemplated that the wheels may begin straightening out prior to the wheels locking into place, in which case the wheels traverse a highly exaggerated S-shaped path during the toe in operation. The toe in operation may be "passive," as described above, or an "active" operation comprising a reverse of the active toe out operation previously described.

In certain embodiments, the TITO operations may be partially or fully automated. For example, in the above described methods, the vehicle operator may be driving the vehicle in a conventional manner, during which the operator actuates a switch inside the vehicle cabin. The switch in communication with the controller 212 signals to perform either the toe in or toe out operation with the vehicle moving as driven by the operator. The controller 212 may prompt the operator through an output (not shown) to drive the vehicle below a predetermined speed in order to properly effectuate the toe in or toe out operation. Such an exemplary method is partially automated, as the operator drives the vehicle while the axle assembly 30 of the present disclosure performs the toe in or toe out operation.

In another exemplary method, the toe in or toe out operation is fully automated. The vehicle operator is within the cabin with the vehicle at rest, or the method may be actuated remotely, such as over a wireless network. The operator actuates a switch inside the vehicle cabin. The switch in communication with the controller 212 signals to perform either the toe in or toe out operation without further input from the operator. The controller 212 in communication with the ECM 88 of the vehicle, the sensors S, 220, the steering actuators 150, 150', the track actuators 152, 152', and the like, is adapted to control all aspects of the toe in or toe out operation as previously described. The controller 212 is adapted to actuate the steering actuators 150, 150', actuate the track actuators 152, 152', and move the vehicle in a coordinated manner to widen or narrow the track of the vehicle in the toe out or toe in operation, respectively. It is understood that in exemplary embodiments wherein the TITO operations are hydraulically controlled, the rear axle may be a rigid axle.

It is also understood from the above disclosure that moving the axle assembly 30 between the retracted and extended configurations may occur while the vehicle is at rest. While the vehicle is at rest, however, the frictional forces between the wheel patch (i.e., the contact area between the wheels and the ground) are appreciable, particularly given the weight of the vehicle and potential terrains on which the vehicle is operating. Therefore, adjusting the track of the vehicle while at rest requires significant forces from the track actuators 152, 152'.

The foregoing is directed to specific versions of the disclosure. Other versions of the disclosure may have different features. It should likewise be understood that not all versions of the disclosure may have each of the above described features. Likewise, the features of the different versions of the disclosure may be combined. Accordingly, it is an object of the appended claims to cover all such variations and modifications that come within the scope of this disclosure.

What is claimed is:

1. An axle assembly comprising:
a central housing comprising at least one sidewall defining a closed channel;
a movable housing movably positioned within said closed channel of said central housing and comprising an upper wall opposite a lower wall, and opposing lateral walls separating said upper and lower walls;
a wheel end assembly coupled to said movable housing and adapted to be coupled with a wheel rotatable relative to said axle assembly with said wheel end assembly comprising a steering arm configured to pivot about a pivot axis, wherein said movable housing moves within said closed channel of said central housing between a retracted configuration in which said wheel end assembly is at a first distance from said central housing, and an extended configuration in which wheel end assembly is at a second distance from said central housing greater than said first distance;
a mounting assembly fixedly coupled to said movable housing and comprising a mounting plate spaced from one of said opposing lateral walls of said movable housing to be slidably positioned adjacent said at least one sidewall of said central housing as said movable housing moves between said retracted configuration and said extended configuration, and a mounting head fixedly coupled to said mounting plate; and
a steering actuator comprising opposing ends with a first of said opposing ends coupled to said steering arm and a second of said opposing ends coupled to said mounting head such that said first and second opposing ends of said steering actuator move as a unit during said movement of said movable housing between said retracted configuration and said extended configuration.

2. The axle assembly of claim 1, further comprising a track actuator fixedly coupled relative to said central housing and further coupled to said movable housing with said track actuator configured to move said movable housing between said retracted configuration and said extended configuration.

3. The axle assembly of claim 1, wherein said at least one sidewall of said central housing further comprises opposing sidewalls separated by top and bottom walls with said mounting plate being parallel to one of said opposing sidewalls of said central housing.

4. The axle assembly of claim 3, further comprising a track assist bracket fixedly coupled to said at least one sidewall of said central housing and spaced apart from said at least one sidewall to define a gap sized to slidably receive said mounting plate as said movable housing moves between said retracted and said extended configurations.

5. The axle assembly of claim 4, wherein said mounting plate further comprises opposing sides defining a thickness of said mounting plate, and an elongate slot extending through said opposing sides with said elongate slot configured to receive a reinforcement member coupling said track assist bracket to said central housing.

6. The axle assembly of claim 1, wherein said upper wall, said lower wall, and said opposing lateral walls of said movable housing define a void space in communication with said closed channel of said central housing, said axle assembly further comprising a drive shaft coupled to said wheel end assembly and at least partially extending through said closed channel of said central housing and said void space of said movable housing.

7. The axle assembly of claim 6, wherein said drive shaft comprises a length defined between opposing ends, telescoping sections rotatably fixed and axially movable to one another with splines to provide for adjustment of said length while transmitting torque between said opposing ends as said movable housing moves between said retracted and extended configurations.

8. The axle assembly of claim 1, further comprising a bushing disposed on each of said upper wall, said lower wall, and said opposing lateral walls with said bushings configured to be in sliding engagement with inner surfaces of said central housing as said movable housing moves relative to said central housing.

9. The axle assembly of claim 1, further comprising a bellows comprising opposing ends and formed from concertinaed sides defining a passageway sized to receive said movable housing with one of said ends fixedly coupled to said central housing and the other of said ends fixedly coupled to one of said movable housing and said wheel end assembly.

10. The axle assembly of claim 9, wherein said concertinaed sides are adapted to expand as said movable housing moves from said retracted configuration to said extended configuration such that portions of said bushings exposed from said closed channel in said extended configuration are entirely enclosed within said bellows.

11. An axle assembly comprising:
a first central housing comprising at least one sidewall defining a first closed channel;
a first movable housing movably positioned within and at least partially extending from said first closed channel of said first central housing;
a first wheel end assembly coupled to said first movable housing and adapted to be coupled with a first wheel rotatable relative to said axle assembly;
a first track actuator coupled to said first central housing and said first movable housing with said first track actuator configured to move said first movable housing within said first closed channel of said first central housing;

a second central housing comprising at least one sidewall defining a second closed channel in communication with the first closed channel;

a second movable housing movably positioned within and at least partially extending from said second closed channel of said second central housing opposite said first movable housing;

a second wheel end assembly coupled to said second movable housing and adapted to be coupled with a second wheel rotatable relative to said axle assembly;

a second track actuator coupled to said second central housing and said second movable housing with said second track actuator configured to move said second movable housing within said second closed channel of said second central housing;

a first set of bushings coupled to said first movable housing and in sliding engagement with an inner surface of said at least one sidewall of said first central housing; and a second set of bushings coupled to said second movable housing and in sliding engagement with an inner surface of said at least one sidewall of said second central housing.

12. The axle assembly of claim 11, further comprising:
a first drive shaft coupled to said first wheel end assembly and at least partially extending through said first closed channel of said first central housing; and
a second drive shaft coupled to said second wheel end assembly and at least partially extending through said second closed channel of said second central housing.

13. The axle assembly of claim 12, further comprising a differential configured to be disposed within a carrier housing coupled to and positioned between said first and second central housings with said differential operably coupled to said first and second drive shafts.

14. The axle assembly of claim 11, wherein each of said first and second movable housings comprises an upper wall opposite a lower wall, and opposing lateral walls separating said upper and lower walls with each of said first and second sets of bushings comprising a bushing disposed on each of said upper, lower, and opposing lateral walls of a respective one of said first and second movable housings.

15. The axle assembly of claim 11, wherein at least a portion of each bushing of said first and second sets of bushings is exposed from a respective one of said first and second closed channels when said first and second movable housings are in an extended configuration.

16. The axle assembly of claim 15, further comprising first and second bellows each formed from concertinaed sides defining a passageway sized to receive said a respective one of said first and second movable housings such that said exposed portions of said bushings are entirely enclosed within said first and second bellows.

17. An axle assembly comprising:
a central housing comprising at least one sidewall defining a closed channel;
a movable housing movably positioned within said closed channel of said central housing;
a wheel end assembly coupled to said movable housing and adapted to be coupled with a wheel rotatable relative to said axle assembly with said movable housing adapted to move within said closed channel relative to said central housing between a retracted configuration in which said wheel end assembly is at a first distance from said central housing, and an extended configuration in which wheel end assembly is at a second distance from said central housing greater than said first distance;
a track actuator coupled to said central housing and said movable housing with said track actuator configured to move said movable housing between said retracted configuration and said extended configuration; and
a bellows comprising opposing ends and formed from concertinaed sides defining a passageway sized to receive said movable housing with a first of said ends fixedly coupled to said central housing and a second of said ends fixedly coupled to one of said movable housing and said wheel end assembly and adapted to move as said movable housing moves between said retracted and said extended configurations.

18. The axle assembly of claim 17, wherein said movable housing further comprises an upper wall opposite a lower wall, and opposing lateral walls separating said upper and lower walls to define a square-shaped cross section, wherein said passageway of said bellows is square in cross section and sized to receive said movable housing.

19. The axle assembly of claim 17, further comprising a steering actuator coupled to said movable housing and said wheel end assembly and configured to pivot said wheel end assembly relative to said movable housing with said steering actuator positioned external to said passageway of said bellows.

20. The axle assembly of claim 17, wherein said track actuator is positioned external to said passageway of said bellows.

* * * * *